US011911324B2

(12) United States Patent
White et al.

(10) Patent No.: US 11,911,324 B2
(45) **Date of Patent: *Feb. 27, 2024**

(54) BED LIFT SYSTEM AND METHODS OF MAKING AND USING THE SAME

(71) Applicant: Principle Long Term Care Inc., Garner, NC (US)

(72) Inventors: Jonathan Earl White, Apex, NC (US); Maxwell Olszewski Mason, Chapel Hill, NC (US)

(73) Assignee: Principle Long Term Care Inc., Kinston, NC (US)

( * ) Notice: Subject to any disclaimer, the term of this patent is extended or adjusted under 35 U.S.C. 154(b) by 88 days.

This patent is subject to a terminal disclaimer.

(21) Appl. No.: 17/403,073

(22) Filed: Aug. 16, 2021

(65) Prior Publication Data

US 2021/0369519 A1 Dec. 2, 2021

Related U.S. Application Data

(63) Continuation of application No. 16/434,336, filed on Jun. 7, 2019, now Pat. No. 11,110,018.

(60) Provisional application No. 62/683,068, filed on Jun. 11, 2018.

(51) Int. Cl.

| | |
|---|---|
| ***A61G 7/002*** | (2006.01) |
| ***A47C 17/52*** | (2006.01) |
| ***A47C 19/22*** | (2006.01) |
| ***A47C 17/38*** | (2006.01) |

(52) U.S. Cl.

CPC .............. *A61G 7/002* (2013.01); *A47C 17/52* (2013.01); *A47C 17/38* (2013.01); *A47C 19/22* (2013.01)

(58) Field of Classification Search

CPC ......... A47C 17/52; A47C 17/54; A47C 17/56; A47C 17/58; A47C 17/62; A47C 17/38–60; A47C 19/22; A61G 7/002; A61G 7/08; A61G 3/0883; A61G 1/06

See application file for complete search history.

(56) References Cited

U.S. PATENT DOCUMENTS

| | | | | |
|---|---|---|---|---|
| 2,570,344 A * | 10/1951 | Hoffmann | .............. | A47C 17/44 5/145 |
| 11,110,018 B2 | 9/2021 | White et al. | | |
| 2010/0212087 A1* | 8/2010 | Leib | ....................... | A61G 12/00 5/81.1 R |

(Continued)

FOREIGN PATENT DOCUMENTS

| | | | |
|---|---|---|---|
| DE | 3215637 A1 * | 8/1981 | ............. A47C 17/48 |

*Primary Examiner* — Justin C Mikowski
*Assistant Examiner* — Amanda L Bailey
(74) *Attorney, Agent, or Firm* — NK Patent Law

(57) ABSTRACT

A lift system includes a support configured to maintain a bed frame thereon. The support is defined by a first swing arm opposing a second swing arm and a pivoting plate opposing an end plate. First ends of the swing arms are configured to swing outward about ends of the pivoting plate. Second ends of the swing arms removably attach to the end plate to form a rectangular structure for securely receiving a bed frame. The lift system also includes a storage unit defined by a lift gate configured within an interior of the storage unit. The lift gate includes a linear actuator for converting the support between a folded and an unfolded position by manipulating the pivoting plate coupled to the linear actuator. A controller is provided for controlling the lift gate.

14 Claims, 26 Drawing Sheets

(56) References Cited

U.S. PATENT DOCUMENTS

| | | | | |
|---|---|---|---|---|
| 2012/0237326 | A1* | 9/2012 | Van Ness | A61G 3/0236 414/812 |
| 2015/0230620 | A1* | 8/2015 | Guyvoronskiy | A47C 17/38 5/164.1 |
| 2019/0133329 | A1* | 5/2019 | Blom | A47C 20/08 |

* cited by examiner

BED LIFT SYSTEM AND METHODS OF MAKING AND USING THE SAME

CROSS-REFERENCE TO RELATED APPLICATION(S)

This application is a continuation of U.S. patent application Ser. No. 16/434,336 filed Jun. 7, 2019, entitled "BED LIFT SYSTEM AND METHODS OF MAKING AND USING THE SAME", which claims the benefit of U.S. Provisional Patent Application No. 62/683,068 filed Jun. 11, 2018, entitled "BED LIFT SYSTEM AND METHODS OF MAKING AND USING THE SAME", the entire contents of all of which are incorporated by reference herein.

TECHNICAL FIELD

The presently disclosed subject matter relates to a lift system that converts a bed frame used in a medical environment from a use position to a lifted storage position. The presently disclosed subject matter further includes methods of making and using the disclosed lift system.

BACKGROUND

Within a skilled nursing setting and similar other patient care settings, beds take up a large amount of floor space within the standard patient room. When beds are not frequently required or when space is otherwise needed, beds that can be stored away with a small footprint are desirable. However, existing convertible beds are generally bulky and include a complicated folding and unfolding mechanism, making them inconvenient and difficult to operate. In addition, existing convertible beds may not meet the medical needs of patients. Further, conventional convertible beds are frequently mounted to the wall, leading to damage to the building structure and prevents the user from changing the location of the bed. Accordingly, it would be beneficial to provide a lift system for storing beds that is aesthetically pleasing, safe, and easy to use.

SUMMARY

This summary is provided to introduce in a simplified form concepts that are further described in the following detailed descriptions. This summary is not intended to identify key features or essential features of the claimed subject matter, nor is it to be construed as limiting the scope of the claimed subject matter.

In some embodiments, the presently disclosed subject matter is directed to a lift system comprising a support configured to maintain a bed frame thereon. The support is defined by a top face and a bottom face, one or more bumpers positioned on the top face, a handle positioned on top face, wherein the handle has a storage configuration and a deployed configuration. The storage unit is defined by a folding mechanism configured within an interior of the storage unit, a front wall that can be maneuvered to the interior of the storage unit, and a lift that converts between the support between a folded and unfolded position, wherein the lift comprises one or more weight-bearing braces and an apex that enables the lift to convert between the folded and unfolded positions. The folding mechanism is defined by a primary bar connected to a primary spring, a secondary bar connected to a secondary spring, a clasp that releasably connects to a tab positioned on the primary bar, and a plurality of cords that connect the lift braces to the primary and secondary bars. The folding mechanism is unlocked to allow the support to be lifted into the interior of the storage unit when the handle is in the deployed configuration and when the bumpers are interlocked with the lift.

In some embodiments, the lift system further comprises a bed frame configured on the top surface of the support.

In some embodiments, the support is configured in a rectangular shape.

In some embodiments, the primary spring comprises a damper.

In some embodiments, the primary spring and the secondary spring are configured as coiled springs.

In some embodiments, the system is further configured to allow the lift to be folded within the interior of the storage unit in the absence of the frame.

In some embodiments, the primary bar remains in a locked position and the secondary bar is elevated to allow the lift to be folded within the interior of the storage unit.

In some embodiments, the primary bar is connected to the primary spring through the use of a cord that passes through the secondary bar.

In some embodiments, the secondary bar is connected to the secondary spring through the use of a cord. In some embodiments, the cord raises and lowers the primary bar, the secondary bar, or both through a pulley system.

In some embodiments, the presently disclosed subject matter is directed to a method of folding a bed frame into the interior of a storage unit. The method comprises positioning the bed frame on the top surface of the support such that the bed frame interlocks with the support bumpers of a lift system. The lift system comprises a support configured to maintain a bed frame thereon. The support is defined by a top face and a bottom face, one or more bumpers positioned on the top face, and a handle positioned on top face, wherein the handle has a storage configuration and a deployed configuration. The storage unit is defined by a folding mechanism configured within an interior of the storage unit, a front wall that can be maneuvered to the interior of the storage unit, a lift that converts between a folded and unfolded position, wherein the lift comprises one or more weight-bearing braces and an apex that enables the lift to convert between the folded and unfolded positions. The folding mechanism is unlocked to allow the support to be lifted into the interior of the storage unit when the handle is in the deployed configuration and when the bumpers are interlocked with the lift. The method further includes converting the handle of the support to the deployed configuration, thereby unlocking a folding mechanism positioned within the interior of the storage unit, allowing the support and frame to be folded, and folding the support and frame into the interior of the storage unit by applying an upward force, whereby the lift is converted to the folded orientation. The support and frame are folded through the use of the folding mechanism comprising a primary bar connected to a primary spring, a secondary bar connected to a secondary spring, a clasp that releasably connects to a tab positioned on the primary bar, and a plurality of cords that connect the lift braces to the primary and secondary bars. The clasp of the folding mechanism is released when the folding mechanism is unlocked, and the primary and secondary bars are elevated by the primary and secondary springs, respectively, when the frame is in the folded position.

In some embodiments, the method further comprises positioning a mattress on a top surface of the frame prior to folding.

In some embodiments, the support is configured in a rectangular shape.

In some embodiments, the primary spring comprises a damper.

In some embodiments, the primary spring and the secondary spring are configured as coiled springs.

In some embodiments, the primary bar is connected to the primary spring through the use of a cord that passes through the secondary bar.

In some embodiments, the secondary bar is connected to the secondary spring through the use of a cord.

In some embodiments, the cord raises and lowers the primary bar, the secondary bar, or both through a pulley system.

In some embodiments, the presently disclosed subject matter is directed a lift system. The lift system comprises a support configured to maintain a bed frame thereon. The support is defined by a first swing arm opposing a second swing arm; a pivoting plate opposing an end plate. First ends of the swing arms are configured to swing outward about ends of the pivoting plate. Second ends of the swing arms are configured to removably attach to the end plate to form a rectangular structure for securely receiving a bed frame, wherein the end plate detaches from the swing arms and the swing arms pivotally swing outwards about the ends of the pivoting plate to release the bed frame. The lift system also includes a storage unit defined by a lift gate configured within an interior of the storage unit, the lift gate including a linear actuator for converting the support between a folded and an unfolded position by manipulating the pivoting plate coupled to the linear actuator; one or more front doors that can be maneuvered to the interior of the storage unit. The lift system also includes a controller for controlling the lift gate, wherein the lift gate is unlocked to allow the support to be lifted into the interior of the storage unit after the end plate is attached to the swing arms.

In some embodiments, the system further comprises a bed frame received within the support.

In some embodiments, the system is further configured to allow the support with the bed frame to be enclosed within the interior of the storage unit.

In some embodiments, the storage unit includes a false wall opposing the front doors, wherein the false wall is configured for sliding towards a front outer periphery of the storage unit to form a front surface of the storage unit after the support moves to the unfolded position.

In some embodiments, the front doors are configured to be maneuvered sideways into storage unit.

In some embodiments, the system further comprises a bed light coupled to a front top portion of the storage unit.

In some embodiments, the system further comprises an emergency call switch coupled to the storage unit for summoning medical help.

In some embodiments, the system further comprises a motor for operating the linear actuator.

In some embodiments, the system further comprises bolting arrangements near a bottom surface and near a back surface of the storage unit for securing the storage unit.

In some embodiments, the system further comprises a controller access switch for operating the controller.

In some embodiments, the storage unit further comprises a lock for securing the contents therein from unauthorized access.

In some embodiments, the swing arms are removably attached to the pivoting plate by fasteners.

In some embodiments, each swing arm includes a bracket configuration for cooperatively receiving longitudinal side members of the bed frame.

In some embodiments, the system is further configured to release the bed frame from the support; attach a headboard and a footboard to the bed frame; secure the bed frame back within the support by attaching end plate to the swing arms and activating a lock handle coupled to the end plate; raise a bed-bearing surface of the bed frame parallel to floor to reach a predetermined height above floor; and place a mattress or bedding on the bed-bearing surface.

In some embodiments, the presently disclosed subject matter is directed a method of folding a bed frame into the interior of a storage unit. The method comprises positioning the bed frame within a support. The support defined by a first swing arm opposing a second swing arm; and, a pivoting plate opposing an end plate. First ends of the swing arms are configured to pivotally swing outward about ends of the pivoting plate. Second ends of the swing arms are configured to removably attach to the end plate to form a rectangular structure for securely receiving the bed frame. The method also includes securing the bed frame within the support by moving the bed frame towards the pivoting plate and attaching the end plate to the swing arms; operating a controller to move the support securely holding the bed frame from an unfolded position outside the storage unit to a folded position within the storage unit using a lift gate by manipulating the pivoting plate coupled to a linear actuator of the lift gate, the lift gate configured within an interior of the storage unit; maneuvering front doors of the storage unit from the interior of the storage unit to a front outer periphery of the storage unit to close the storage unit; and locking the front doors.

In some embodiments, the method further comprises operating a controller to move the support securely holding the bed frame from the folded position within the storage unit to the unfolded position outside the storage unit using the lift gate; releasing the bed frame from the support; attaching a headboard and a footboard to the bed frame; securing the bed frame back within the support by attaching the end plate to the swing arms and activating a lock handle coupled to the end plate; raising a bed-bearing surface of the bed frame parallel to floor to reach a predetermined height above floor; and placing a bedding or mattress on the bed-bearing surface.

In some embodiments, the method further comprises maneuvering the front doors of the storage unit to the interior of the storage unit.

In some embodiments, the method further comprises sliding a false wall located within the storage unit towards the front outer periphery of the storage unit to form a front surface of the storage unit.

In some embodiments, the method further comprises turning on a bed light coupled to a front top portion of the storage unit.

BRIEF DESCRIPTION OF THE DRAWINGS

The foregoing, as well as the following Detailed Description of preferred embodiments, is better understood when read in conjunction with the appended drawings. For the purposes of illustration, there is shown in the drawings exemplary embodiments; however, the presently disclosed subject matter is not limited to the specific methods and instrumentalities disclosed.

The embodiments illustrated, described, and discussed herein are illustrative of the present invention. As these embodiments of the present invention are described with reference to illustrations, various modifications or adaptations of the methods and or specific structures described may become apparent to those skilled in the art. It will be appreciated that modifications and variations are covered by the above teachings and within the scope of the appended claims without departing from the spirit and intended scope thereof. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

DETAILED DESCRIPTION OF THE EMBODIMENTS

The presently disclosed subject matter is introduced with sufficient details to provide an understanding of one or more particular embodiments of broader inventive subject matters. The descriptions expound upon and exemplify features of those embodiments without limiting the inventive subject matters to the explicitly described embodiments and features. Considerations in view of these descriptions will likely give rise to additional and similar embodiments and features without departing from the scope of the presently disclosed subject matter.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms “a”, “an”, and “the” refer to “one or more” when used in the subject specification, including the claims. Thus, for example, reference to “a device” can include a plurality of such devices, and so forth.

Unless otherwise indicated, all numbers expressing quantities of components, conditions, and so forth used in the specification and claims are to be understood as being modified in all instances by the term “about”. Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments +/−20%, in some embodiments +/−10%, in some embodiments +/−5%, in some embodiments +/−1%, in some embodiments +/−0.5%, and in some embodiments +/−0.1%, from the specified amount, as such variations are appropriate in the disclosed packages and methods.

Figure 1:
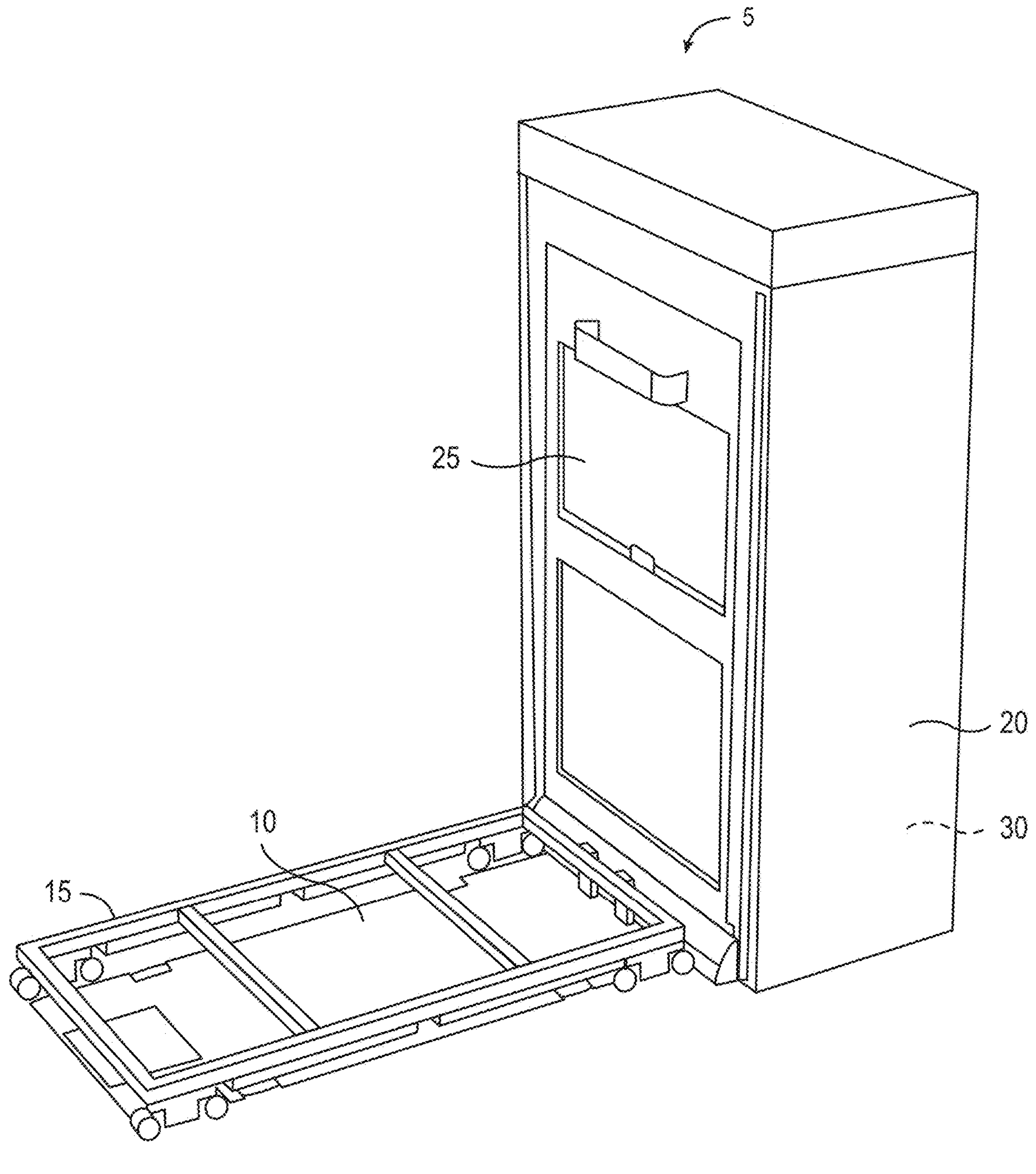
FIG. 1 is a perspective view of a bed lift system in accordance with some embodiments of the presently disclosed subject matter.

The presently disclosed subject matter is directed to a lift system that converts a bed (e.g., a hospital bed) from a horizontal use position to a folded storage position. Particularly, as shown in FIG. 1, lift system 5 includes support 10 upon which a conventional bed frame 15 rests during lifting. Support 10 includes a horizontal position as shown in FIG. 1, and a vertical storage position wherein the support and associated bed frame 15 are housed within the interior of storage unit 20. As set forth in more detail below, the storage unit includes false wall 25 that can be moved to allow support 10 to be raised and stored within interior 30 of the storage unit. The false wall also functions to hide a folding mechanism housed within the interior of the storage unit. The disclosed system therefore provides an aesthetically pleasing and easy-to-use device to store a bed when not in use.

As mentioned herein, the terms "bed" and "bed frame" relate to beds and bed frames used in the medical environment including hospital care, assisted living, outpatient clinics, home health care and extended care, among others. As a person of skill in the art understands, beds and bed frames used is such applications are typically heavier as compared to beds and bed frames used in other applications. Further, the beds and bed frames used in various medical environments can also include several features such as: wheels, ability to be raises and lowered at the head, feet, and their entire height, side rails hat can be raised or lowered, tilting the bed to 15-30 degrees on each side, bed exit alarm to warn when a patient leaves the bed, and electrical connections, among others. The lift systems as described herein are configured for use with all such bed and bed frame applications.

Figure 2A:
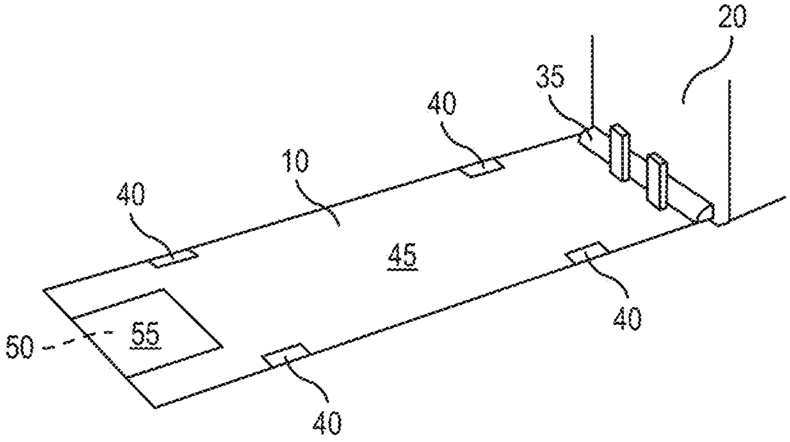
FIG. 2A is a perspective view of a bed support in accordance with some embodiments of the presently disclosed subject matter.
Figure 2B:
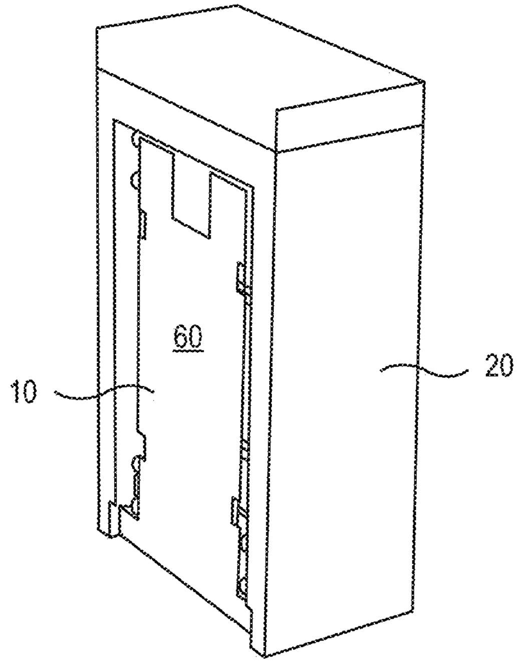
FIG. 2B is a perspective view of the support of FIG. 2*a* positioned within a storage unit in accordance with some embodiments of the presently disclosed subject matter.

As set forth above, lift system 5 comprises support 10 upon which a conventional bed frame rests during lifting. Conventional bed frame 15 can include beds typically used in a medical (e.g., hospital) setting. FIG. 2A illustrates one embodiment of support 10 that attaches to the storage unit at the bottom portion of the front face, adjacent to false wall 25. In the use position of FIG. 2*a*, the support is positioned adjacent to the floor. In the folded storage position, support 10 provides a clean look to the system, as illustrated in FIG. 2B.

As shown in FIG. 2A, in some embodiments, support 10 comprises one or more connectors 40 that function to maintain a mattress and/or bed frame on the support. For example, connector 40 can be selected from one or more hooks, clips, loops, straps, VELCRO®, and the like to ensure that bed frame 15 remains positioned on top face 45 and does not shift during lifting.

Support 10 further comprises one or more bumpers 35 that act as a failsafe to ensure that the disclosed lift mechanism uses the proper amount of lift force. The bumpers can be attached to the support using any known mechanism, such as welding, adhesive, and/or the use of mechanical parts (e.g., bolts, screws, clips, brackets, and the like).

Bumpers 35 can be constructed in any desired shape and from any desired material, including (but not limited to) metal, plastic, wood, and the like.

Support 10 includes handle 50 that is used to assist the user in raising and lowering the support between the use and storage positions. In addition, deployment of the handle partially unlocks the folding mechanism to allow the frame to be lifted and positioned within the interior of the storage unit. The handle is connected to bumpers 35 and clasp 150 (described below) via a cable. If the bumpers detect the presence of a bed frame, then the pulling of the cable unlocks the clasp. If no bed frame is present, the pulling of the cable does nothing, and the handle simply serves as an element by which to lift the support. Handle 50 can be affixed to one surface of the support. In some embodiments, the handle can include mounting plate 55 that attaches to top face 45 or bottom face 60 of the support, as illustrated in FIG. 2A. The mounting plate allows the handle to be stored when the bed is in the use position, and physically attaches the handle to support 10. In one embodiment, the systems as described herein can allow the support along with the bed frame and the bedding or mattress to be moved to a folded position within the storage unit and back to an unfolded position outside of the storage unit.

Figure 3A:
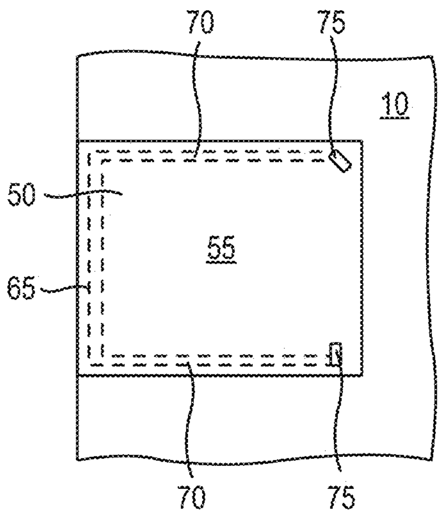
FIGS. 3A-3C are top plan views of a support handle during use in accordance with some embodiments of the presently disclosed subject matter.
Figure 3B:
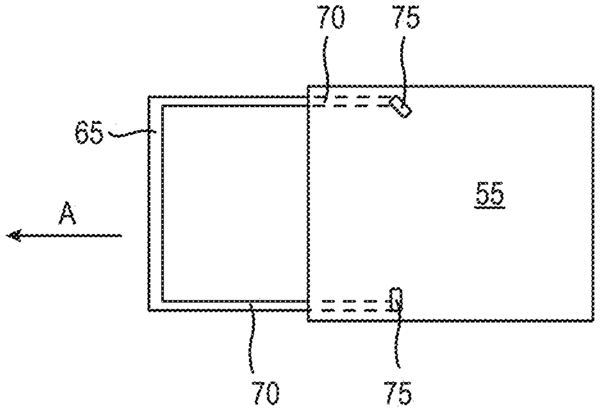
Figure 3C:
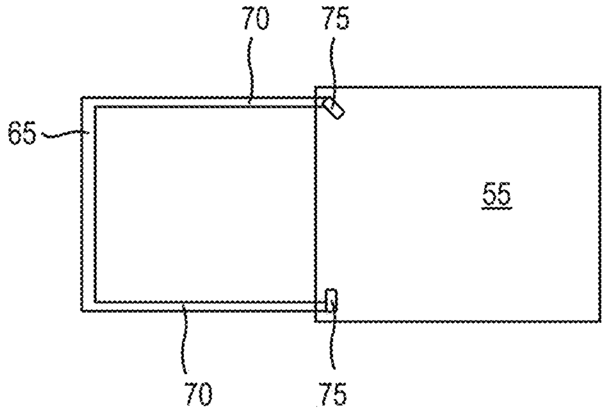
Figure 3D:
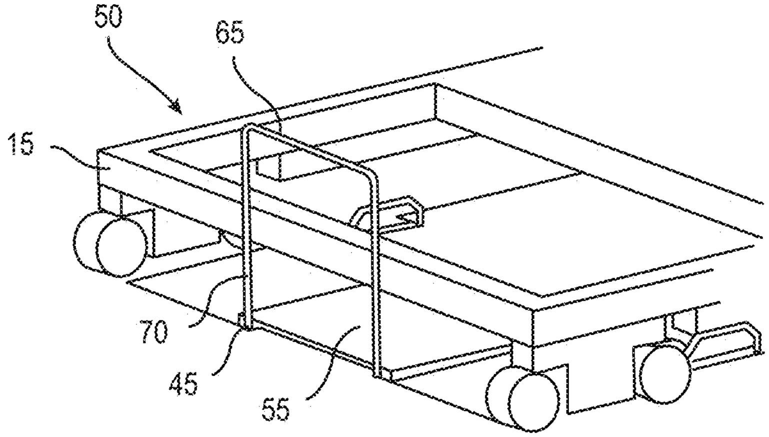
FIG. 3D is a perspective view of a support comprising a deployed handle in accordance with some embodiments of the presently disclosed subject matter.

FIG. 3A illustrates one embodiment of handle 50 positioned within mounting plate 55 during storage. As shown, the handle includes grasping portion 65 and at least one leg 70 with stop 75 positioned at the proximal end of each leg. The grasping element is the portion of the handle that the user grasps during use. In some embodiments, the grasping portion includes padding or gripping elements to provide added comfort and increase the user's grip. Stops 75 are configured to allow the handle to be maintained within the mounting plate. In use, a user grips grasping portion 65 and pulls the handle away from the mounting plate, as illustrated by Arrow A in FIG. 3B. Stops 75 are maintained within the interior of the mounting plate, ensuring that the handle is not removed, as shown in FIG. 3C. In some embodiments, the stops function as a hinge, allowing the grasping element and legs to rotate from the substantially horizontal position of FIG. 3C to the substantially vertical position of FIG. 3D.

Support 10 is configured as rectangular in shape in the figures to accommodate a typical rectangular-shaped bed. However, it should be appreciated that the shape of the support is not limited and it can be configured in any desired shape.

The support can be constructed from any resilient material that is strong enough to support the weight of bed frame 15. For example, the support can be formed from metal (e.g., stainless steel), plastic, wood, or combinations thereof. In some embodiments, support 10 can be constructed from one or more lightweight materials, such as (but not limited to) aluminum, plastic, and the like.

Figure 4A:
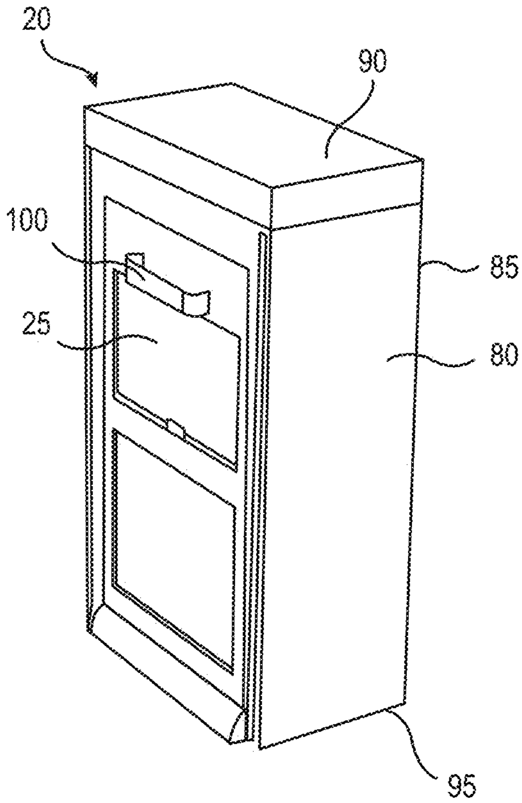
FIGS. 4A and 4B are perspective views illustrating movement of a false wall of a storage unit in accordance with some embodiments of the presently disclosed subject matter.
Figure 4B:
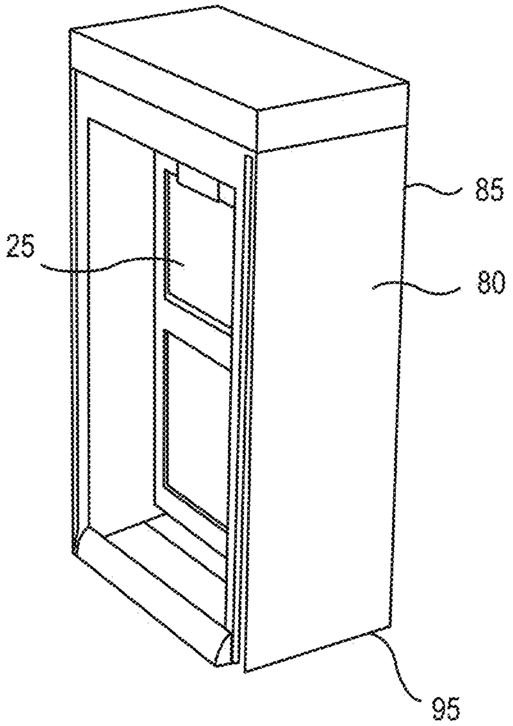

As set forth above, lift system 5 comprises storage unit 20 that can be configured as a cabinet, armoire, or other furniture item that is large enough to accommodate support 10 and bed frame 15 within its interior. FIG. 4A illustrates one embodiment of storage unit 20 comprising false wall 25, side walls 80, rear wall 85, top wall 90, and bottom wall 95. False wall 25 can be pushed in a forward and backward direction, as shown in FIG. 4B. In some embodiments, false wall 25 can include grip 100 to assist the user in pushing or pulling the false wall as desired.

Figure 5A:
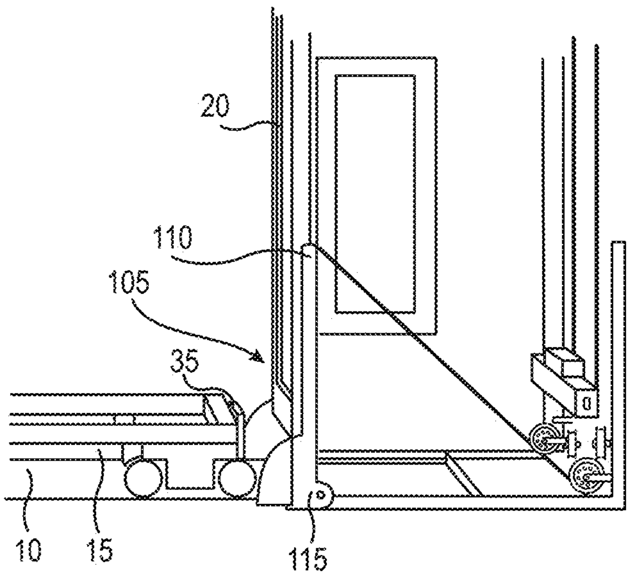
FIGS. 5A-5C are side perspective views illustrating use of a lift to position a frame within the interior of a storage unit in accordance with some embodiments of the presently disclosed subject matter.
Figure 5B:
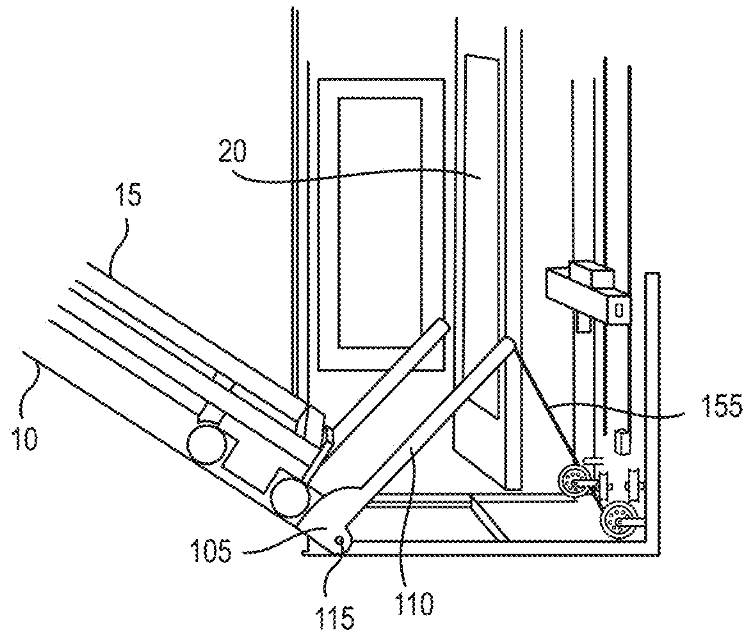
Figure 5C:
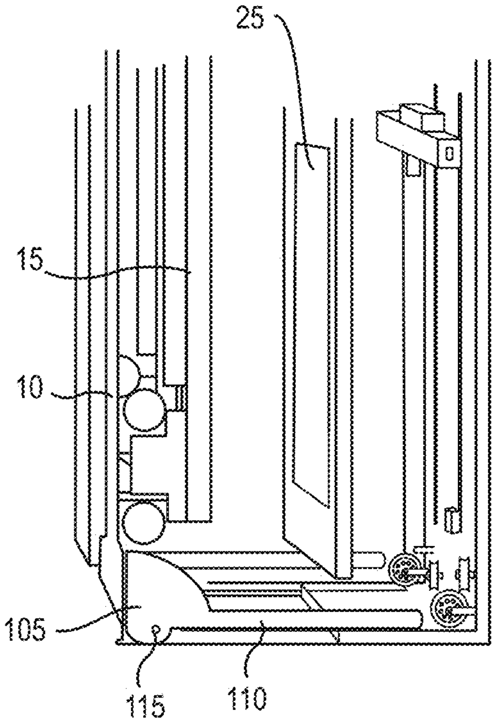

Storage unit 20 comprises lift 105 positioned adjacent to the bottom portion of the front face. As shown in FIG. 5A, lift 105 is attached to support 10. The lift includes braces 110 that extend perpendicularly to the support and provide a surface upon which the weight of the bed frame rests when folded during storage. The lift further includes an apex that allows the lift to pivot between a substantially horizontal orientation to a substantially vertical orientation. For example, FIGS. 5*b* and 5*c* illustrate one embodiment of lift 105 transitioning from the use and storage configurations. As shown, the lift with attached support 10 transitions from a use (e.g., horizontal) orientation to a storage (e.g., vertical) orientation by pivoting on the apex when a user lifts support 10 upwards. In the storage configuration of FIG. 5C, support 10 and bed frame 15 are vertically positioned, with braces 110 bearing the weight of the support and bed frame. As set forth in detail below, lift 105 is raised and lowered through the use of a spring-assisted folding mechanism.

Figure 6:
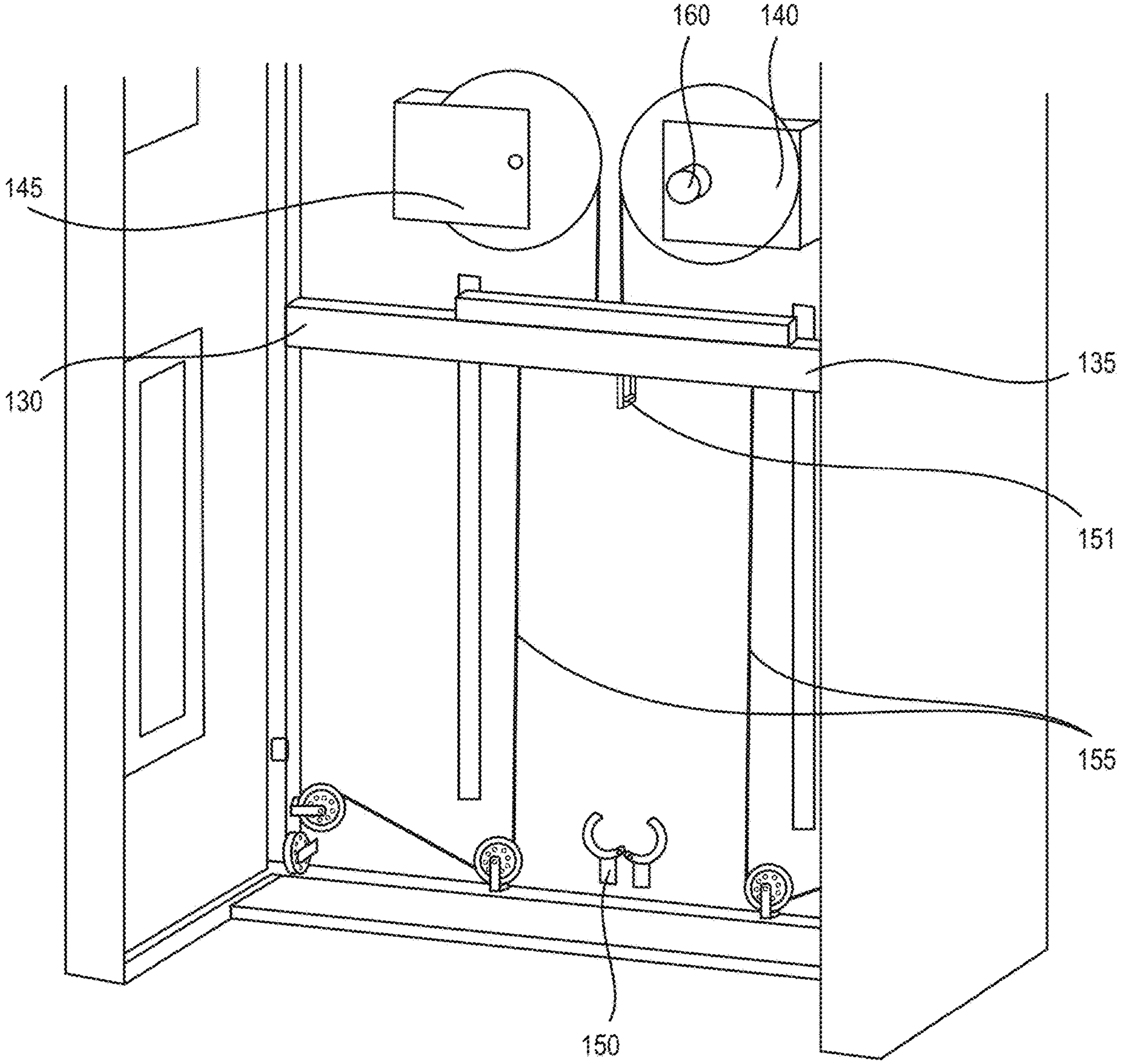
FIG. 6 is a perspective view of the interior of a storage unit comprising a folding mechanism in accordance with some embodiments of the presently disclosed subject matter.

Braces 110 are connected to a folding mechanism positioned within the interior of the storage unit, such as through one or more cords. FIG. 6 illustrates one embodiment of the lift mechanism, including primary lifting bar 130 and secondary lifting bar 135. The lifting bars function to offset the weight of support 10 and bed frame 15 such that the user can easily raise and lower on demand. In some embodiments, primary lifting bar 130 is the bar that offsets the majority of the weight of the frame, and thus is constructed to be heavier, thicker, and/or wider compared to the secondary lifting bar. Bars 130, 135 can be constructed from any of a wide variety of materials known or used in the art, such as (but not limited to) metal. The lifting bars can be configured in any desired shape.

The folding mechanism further includes primary lifting spring 140 and secondary lifting spring 145 that function to raise and lower the primary and secondary lifting bars, respectively. The term "spring" as used herein refers to any flexible or coiled material that exerts a force when it is bent, compressed, or stretched. The spring can be of any shape known in the art, such as coiled, helical, linear, spiral, flat, bent, or conically-shaped. Non-limiting examples of springs include coils, cantilevers, conical, elastic bands, or any other types of springs known in the art. In some embodiments, the primary lifting spring can be a rotational spring to allow for minimal size. In some embodiments, the primary lifting spring includes damper 160 that functions as a safety feature to resist motion in the event of a spring failure. In some embodiments, the damper is a rotational damper to allow for minimal size. As shown, the primary lifting spring is connected to the primary lifting bar via cord 155, passing through the secondary bar. Further, the secondary lifting spring is connected to the secondary lifting bar via cord 155. Lift 115 is connected to the secondary lifting bar, passing through the primary lifting bar via cords 155. The cords allow movement of the bars through a standard pulley system.

Figure 7A:
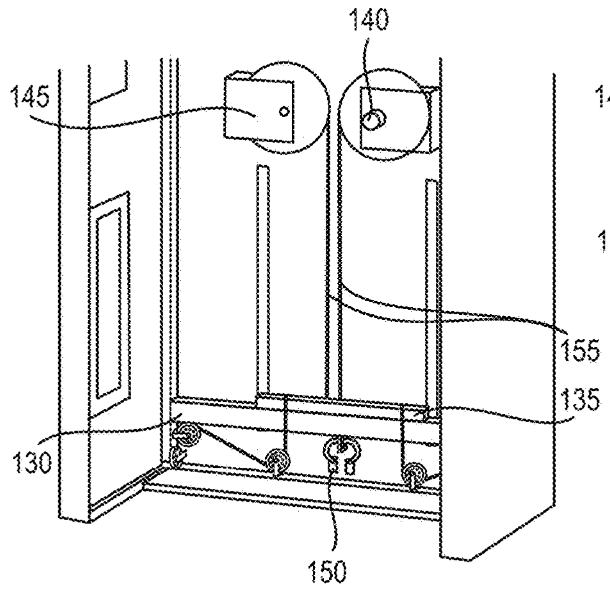
FIGS. 7A and 7B are perspective views of the folding mechanism of FIG. 6 during use in accordance with some embodiments of the presently disclosed subject matter.

The folding mechanism further comprises clasp 150 that functions to lock the primary bar such that it cannot move from a lowered (locked) position. In some embodiments, the clasp can grip tab 151 on the bottom surface of the primary locking bar, as shown in FIG. 6. However, it should be appreciated that any mechanism can be used to lock the primary bar. Thus, fully descended, primary lifting bar 130 will lock into place with clasp 150. The primary and secondary lifting springs are then decoupled from bed frame 15, as illustrated in FIG. 7A. The bed can therefore be moved about the room and separated from lift system 5.

Figure 7B:
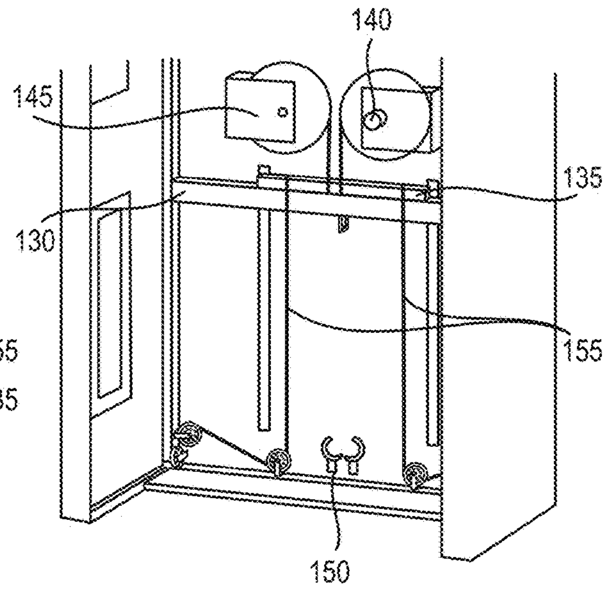

The folding mechanism requires a two-step release to disengage clasp 150 and engage the primary and secondary lifting springs to lift the bed. The two-step release comprises handle 50 and bumpers 35 that act as a release for clasp 150. Particularly, bed frame 15 is first pushed into place, making contact with (e.g., resting against) the bumpers and completing the first interlock. Upon deployment of the handle to the lift position of FIG. 3D, primary lifting bar 130 will be released and able to offset the weight of the frame. Handle 50 is connected to bumpers 35 and clasp 150 by a cable. If the bumpers detect the presence of bed frame 15, then pulling of the cable unlocks the clasp. The bed is then supported by the primary and secondary lifting springs and can be lifted upward for storage, as shown in FIG. 7B.

Figure 8:
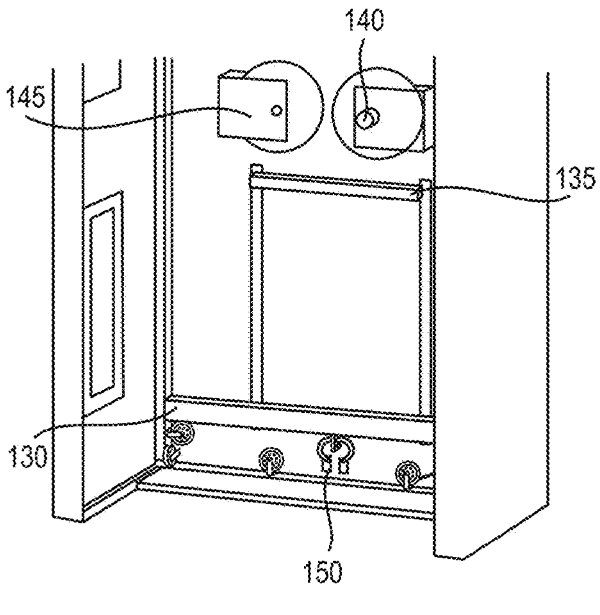
FIG. 8 is a perspective view of the folding mechanism of FIG. 6 during use in the absence of a connected frame in accordance with some embodiments of the presently disclosed subject matter.

The disclosed folding mechanism can be deployed without bed frame 15, such as in embodiments wherein lift 105 is to be enclosed within the support unit (e.g., the bed frame has been moved to a different location or is in use). As shown in FIG. 8, in these embodiments, the primary lifting bar remains in the locked position, but secondary lift spring 145 takes up the slack in the cords by lifting the secondary lifting bar. The tension in primary lifting spring 140 is maintained and locked.

Figure 9A:
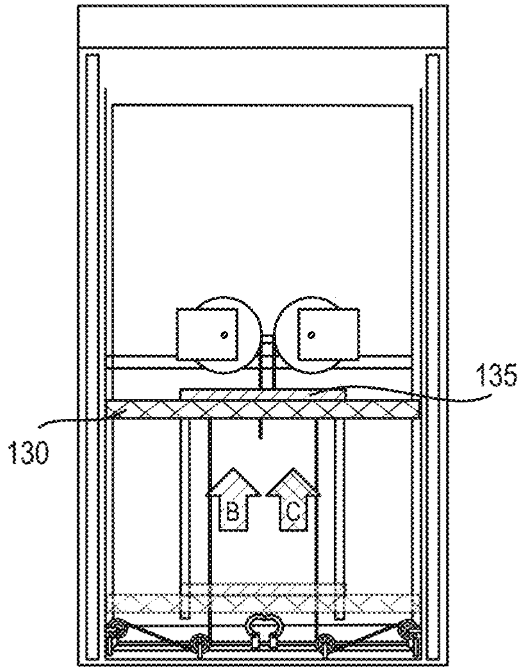
FIGS. 9A and 9B are front plan views illustrating use of a folding mechanism in the presence and absence, respectively, of a bed in accordance with some embodiments of the presently disclosed subject matter.
Figure 9B:
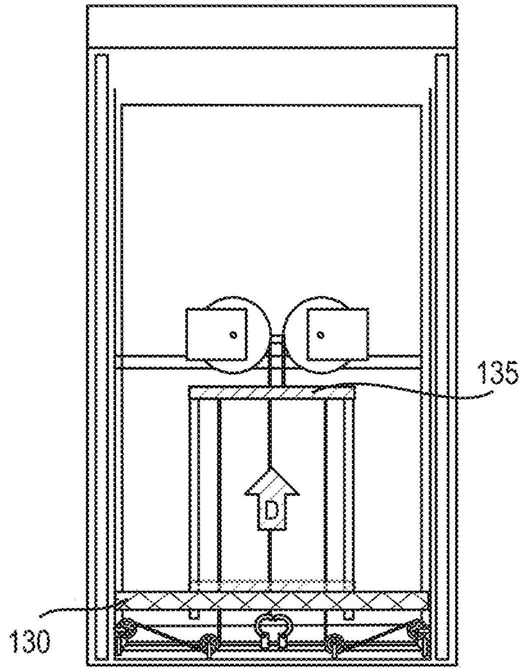

FIGS. 9*a* and 9*b* illustrate the folding mechanism configured with and without bed frame 15. Particularly, as shown in FIG. 9A, when bed frame 15 is attached to lift 105, both the primary and secondary lifting bars are raised to support the lift and frame when in the storage (folded) configuration, as indicated by Arrows B and C. In comparison, FIG. 9B illustrates one embodiment wherein only the lift is housed within the storage unit interior (e.g., without a frame). Primary lifting bar 130 remains locked and only secondary lifting bar 135 is raised to support lift 115, as indicated by Arrow D.

Figure 10:
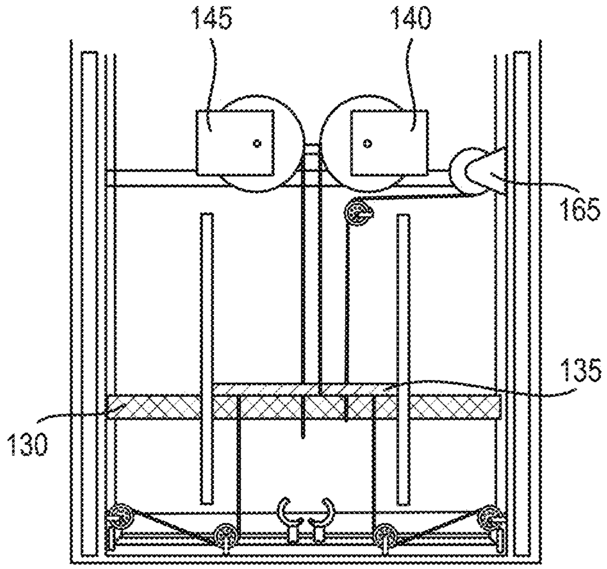
FIG. 10 is a front plan view of a folding mechanism comprising a motor in accordance with some embodiments of the presently disclosed subject matter.

In some embodiments, the folding mechanism can include motor 165, as illustrated in FIG. 10. As shown, the motor can be attached to primary lifting bar 130, passing through the secondary lifting bar. The configuration of FIG. 10 allows the motor to aid in lifting and/or lowering support 10 and bed frame 15, and also allows for free movement if the lift is closed without a frame. Motor 165 is not limited, and any known motor can be used.

Figure 11A:
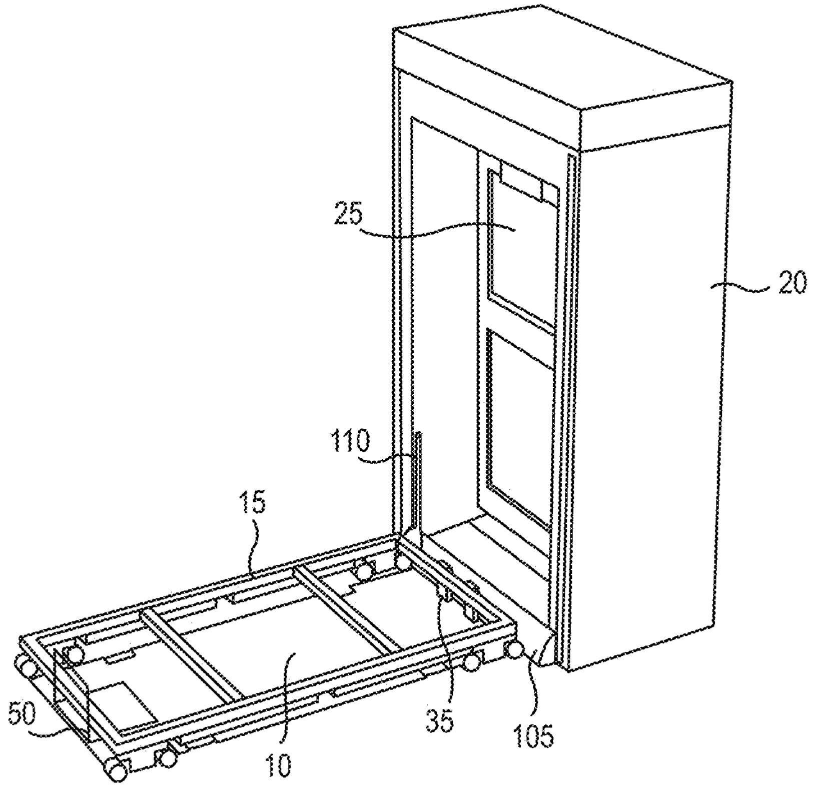
FIGS. 11A-11E are perspective views of the disclosed storage unit during use in accordance with some embodiments of the presently disclosed subject matter.
Figure 11B:
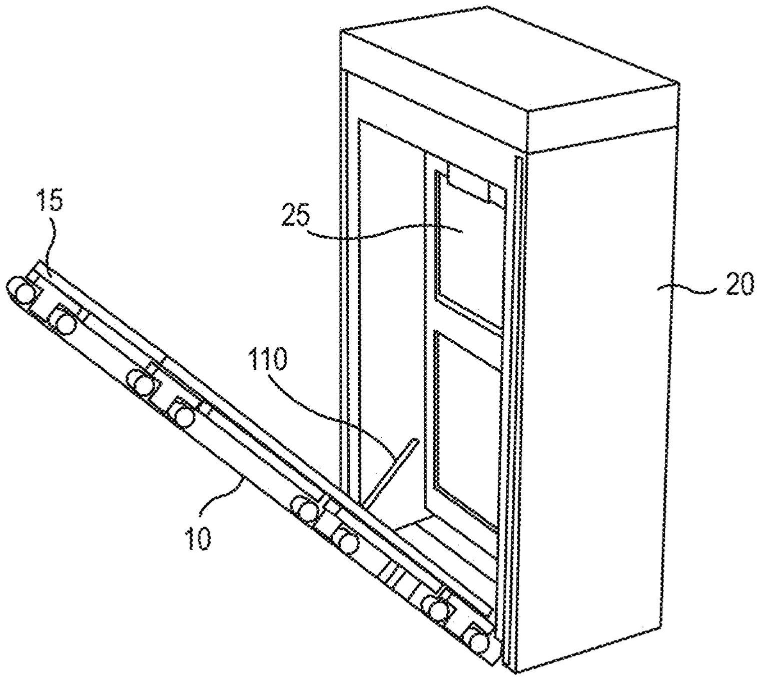
Figure 11C:
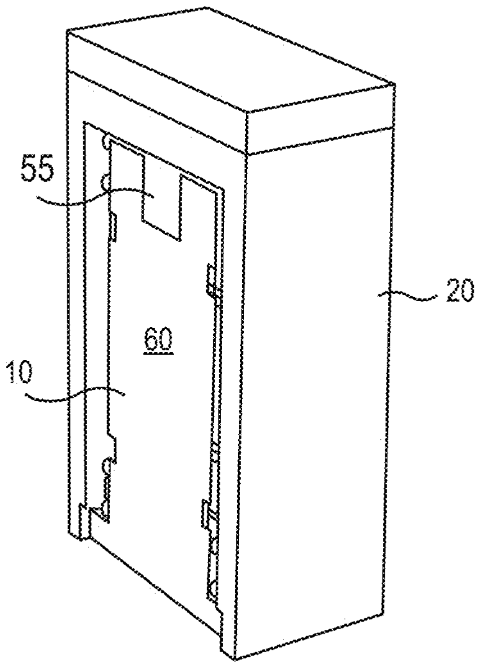
Figure 11D:
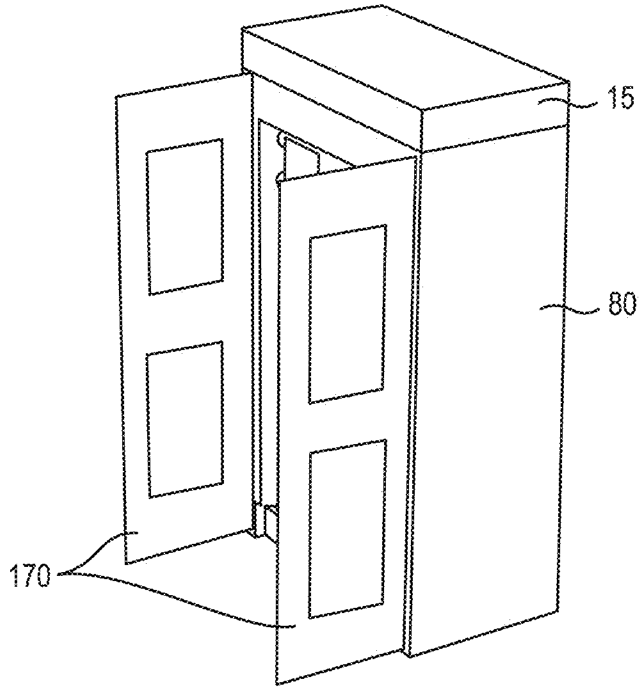
Figure 11E:
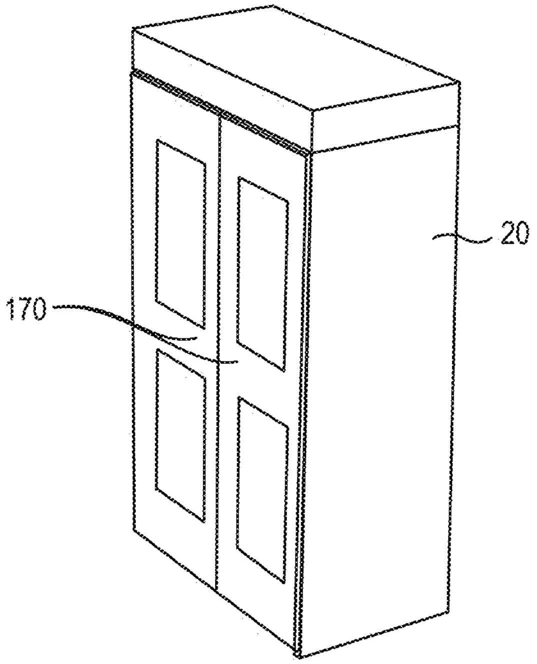

The support unit can be configured to completely stow support 10, bed frame 15, and lift 105 within interior 30. For example, FIG. 11A illustrates one embodiment of bed frame 15 positioned on support 10, with handle 50 deployed and bumpers 35 attached such that the two-step lock is unlocked. Clasp 150 is thus unlocked, allowing the user to lift the support (and attached bed frame) into storage unit interior 30, as shown in FIG. 11B. When the frame is fully enclosed within the interior of the storage unit, bottom face 60 of support 10 is fully visible, as shown in FIG. 11C. In some embodiments, the storage unit includes doors 170 that can be used to hide bottom face 60 from view. For example, doors 170 can be housed within the storage unit interior, parallel to side walls 80, as illustrated in FIG. 11D. The doors can pivot to swing onto the front face of the storage unit, as shown in FIG. 11E. In this way, the disclosed system provides an aesthetic way to store support 10 and bed frame 15 when not in use.

In some embodiments, the storage unit can be configured with a metal frame, such as steel. The storage unit can further include an ornamental exterior, such as wood for a pleasing look.

Optionally, the disclosed system can include overhead lighting as a user convenience feature. For example, the overhead lighting can be mounted on false wall 25 to serve as an area light, task light, accent light, etc.

The disclosed system therefore provides an improved device to allow a user to lift a bed to a stored position, such as in a hospital environment when space is limited and single and double occupancy rooms are interchangeable. The system is lightweight, requiring a user lift force of about 25 pounds or less.

Advantageously, the disclosed system includes a double lock arrangement that ensures that the bed is properly placed prior to lifting to prevent injury to the user and/or damage to the system.

The disclosed system further provides a mechanism to allow the lift to be stored away within the storage unit when the bed is positioned away from the unit. In this way, the system allows the folding mechanism to be out of sight, improving the look and appearance of the storage unit.

FIGS. 12A to 21D illustrate a lift system 5A according to one or more embodiments of the presently disclosed subject matter. Lift system 5A can have same or similar features as lift system 5 described earlier, except as explained herein.

Figure 14A:
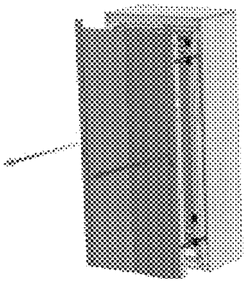
FIGS. 14A-14E are perspective views illustrating use of the bed lift system of FIG. 12A in accordance with some embodiments of the presently disclosed subject matter.

Lift system 5A includes support 510 upon which a conventional bed frame 515 rests during lifting. Bed frame 515 can have the same or similar characteristics as bed frame 15 discussed with regard to lift system 5. Support 510 includes a horizontal position as shown in FIG. 14E, for example, and a vertical storage position as illustrated in FIG. 14A, for example, such that the support 510 and associated bed frame 515 can be housed within the interior of storage unit 20A in the folded position. Storage unit 20A can be configured as a cabinet, armoire, or other furniture item that is large enough to accommodate support 510 and bed frame 515 within its interior. As set forth in more detail below, the storage unit includes a false wall 505 that can be moved to allow support 510 to be raised and stored within interior 530 of the storage unit. The false wall 505 can also function to hide a folding mechanism such as lift gate 550 housed within the interior of storage unit 20A. The disclosed system therefore provides another embodiment of an aesthetically pleasing and easy-to-use device to store a bed when not in use. Accordingly, false wall 505 located within the storage unit can be slid towards the front outer periphery of the storage unit to form a front surface of the storage unit after the support 510 is moved to the unfolded position.

Figure 12A:
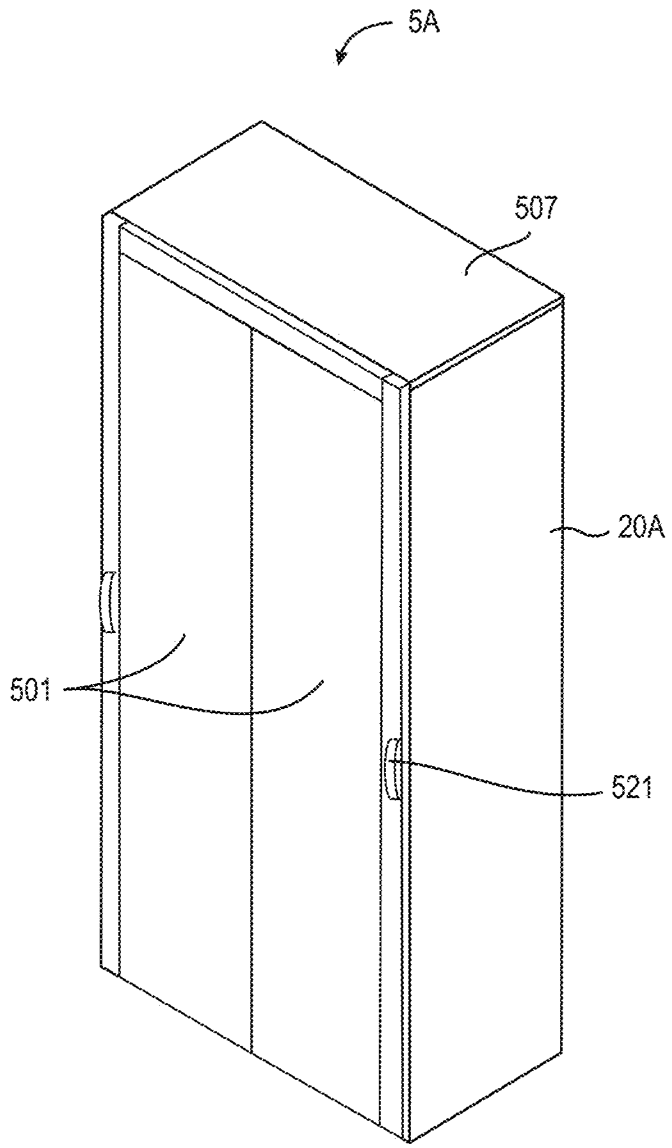
FIG. 12A is a perspective view of a bed lift system in accordance with some embodiments of the presently disclosed subject matter.
Figure 12B:
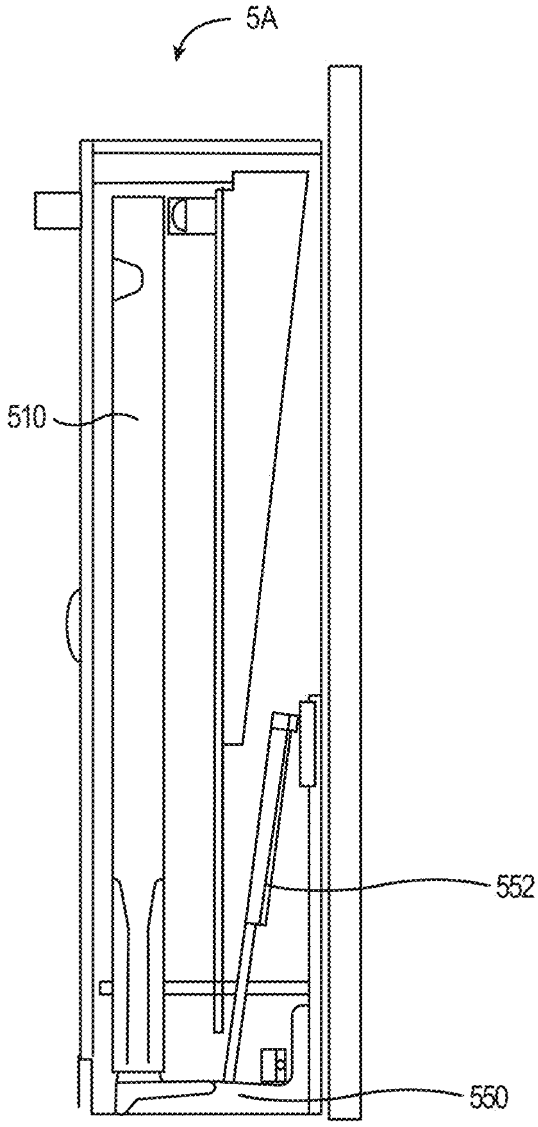
FIGS. 12B-12D are side plan views illustrating use of a folding mechanism of the bed lift system of FIG. 12A in the absence of a bed in accordance with some embodiments of the presently disclosed subject matter.
Figure 12C:
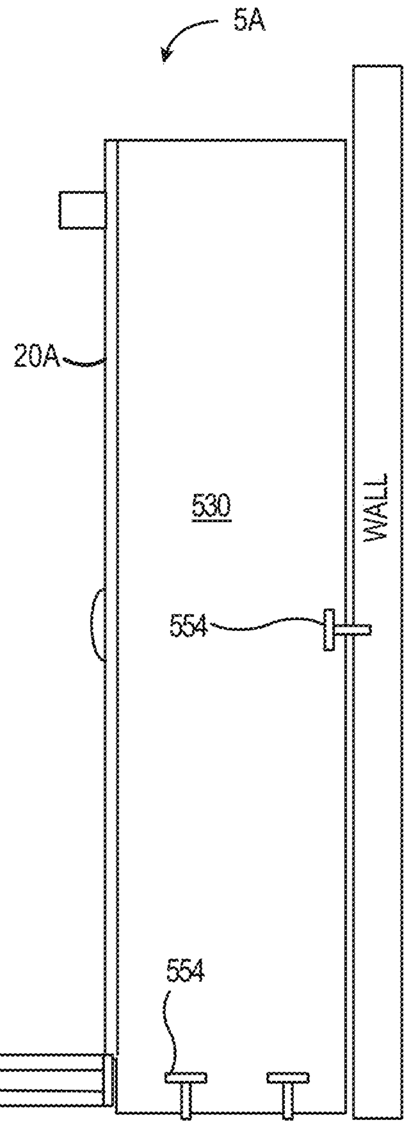
Figure 12C:
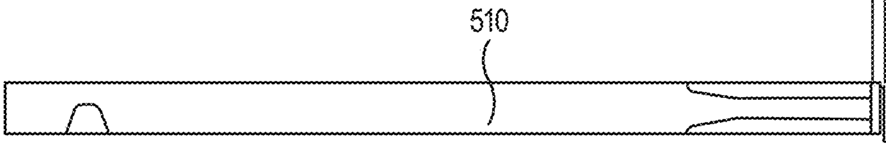
Figure 12D:
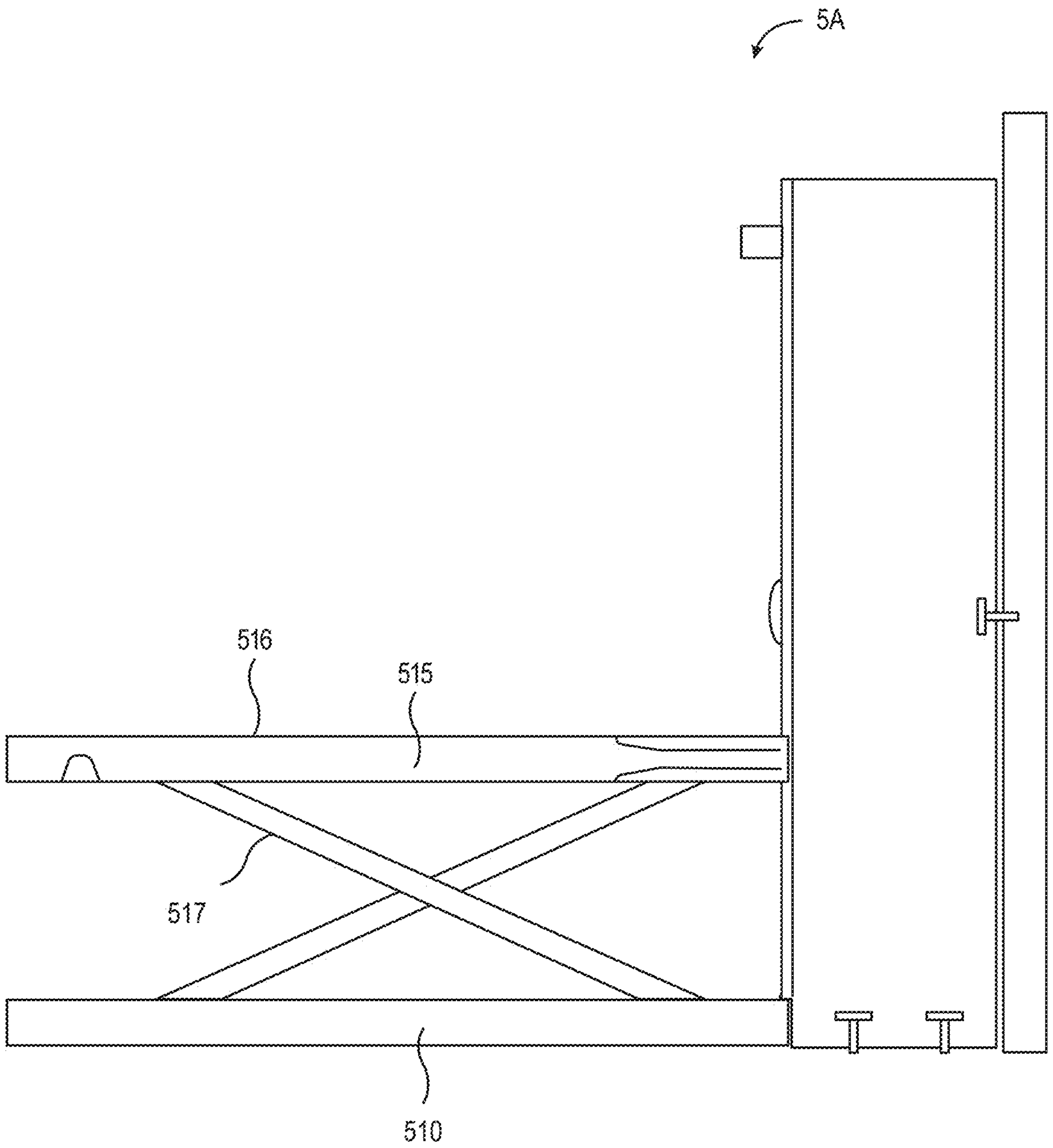
Figure 13:
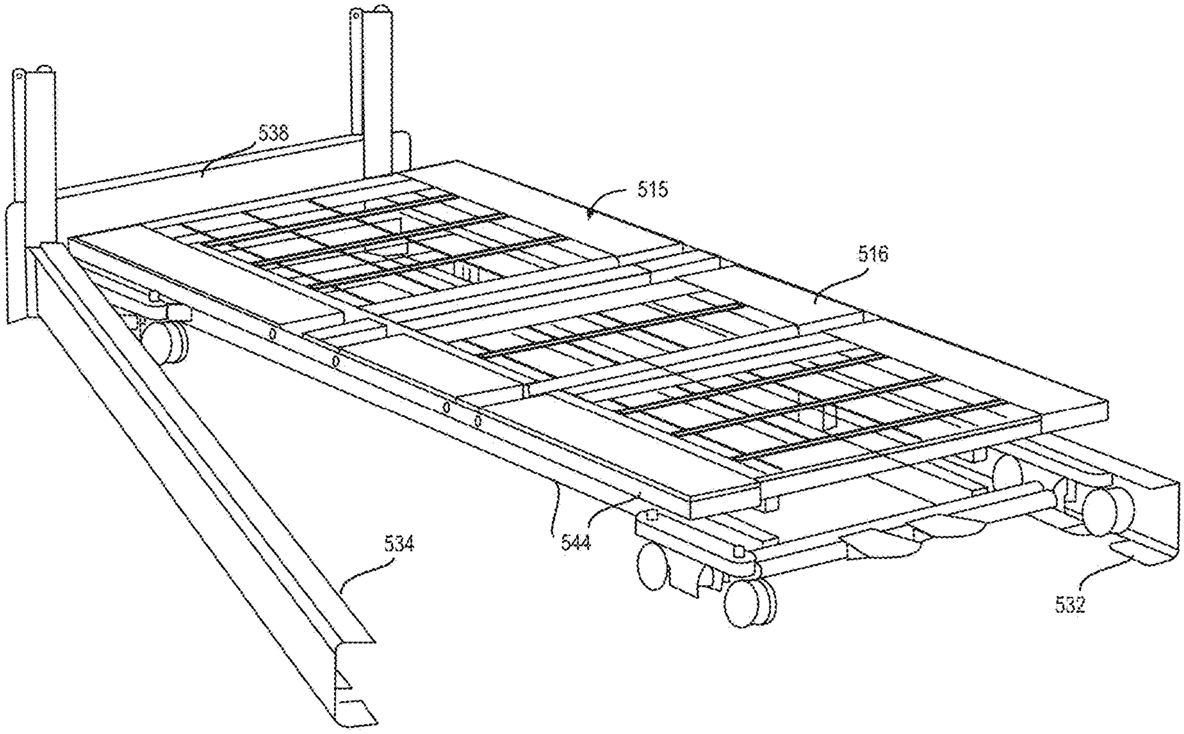
FIG. 13 is a perspective view of a support and a bed frame in accordance with some embodiments of the presently disclosed subject matter.

Lift system 5A comprises support 510 upon which a conventional bed frame such as bed frame 515 rests during lifting. Conventional bed frame 515 can include beds typically used in a medical (e.g., hospital) setting. FIG. 12C illustrates one embodiment of support 510 that attaches to storage unit 20A via pivoting plate 538 located adjacent to a bottom portion of false wall 505. In the use position of FIG. 12C, the support 510 is positioned adjacent to the floor. In the folded storage position, support 510 provides a clean look to the system, as illustrated in FIGS. 12A and 12B.

Figure 20:
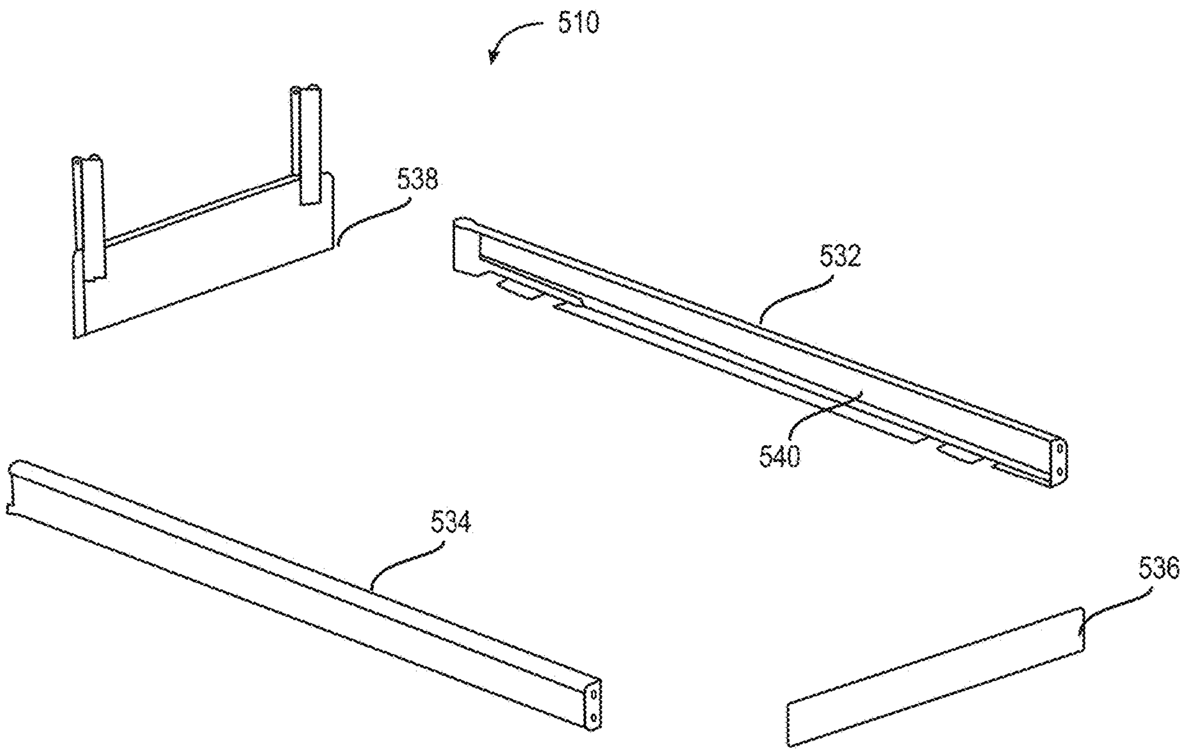
FIG. 20 is a blown-up side perspective view illustrating components of the support associated with the bed lift system of FIG. 12A in accordance with some embodiments of the presently disclosed subject matter.

Accordingly to various embodiments of the presently disclosed subject matter, lift system 5A comprises support 510 configured to securely hold and maintain a bed frame such as bed frame 515 thereon. As shown in FIG. 20, for example, support 510 is defined by first swing arm 532 opposing second swing arm 534, and pivoting plate 538 opposing an end plate 536. In various embodiments, the inward facing side of each of the first and second swing arms includes a bracket configuration 540 for cooperatively receiving longitudinal side members 544 (see FIG. 13) of bed frame 515.

Figure 17A:
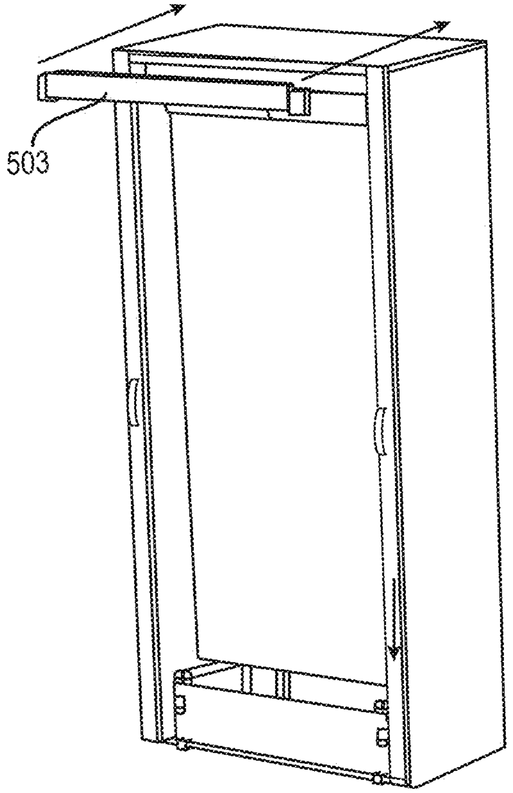
FIGS. 17A-17D are perspective views illustrating use of the bed lift system of FIG. 12A in accordance with some embodiments of the presently disclosed subject matter.
Figure 17B:
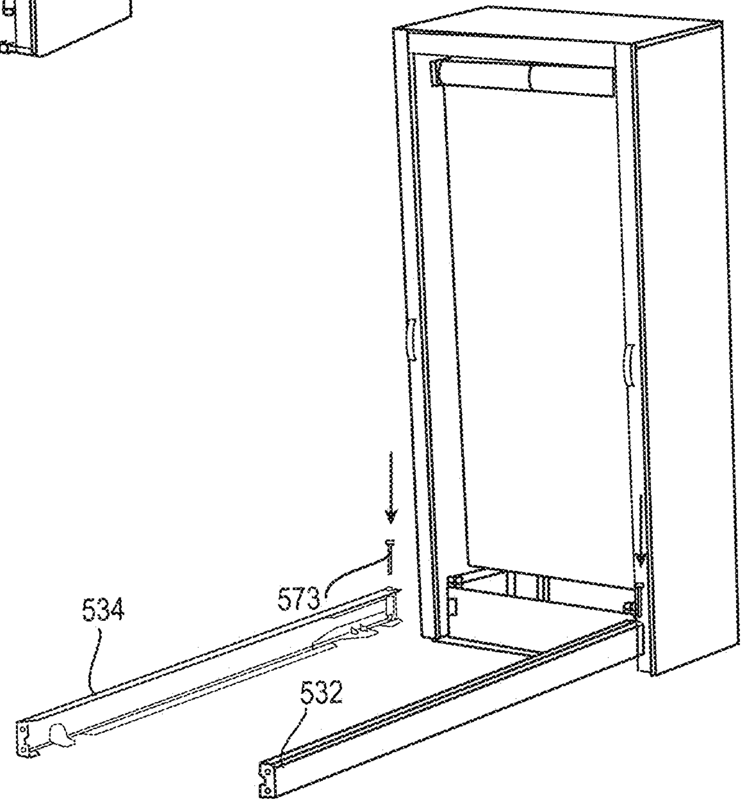
Figure 17C:
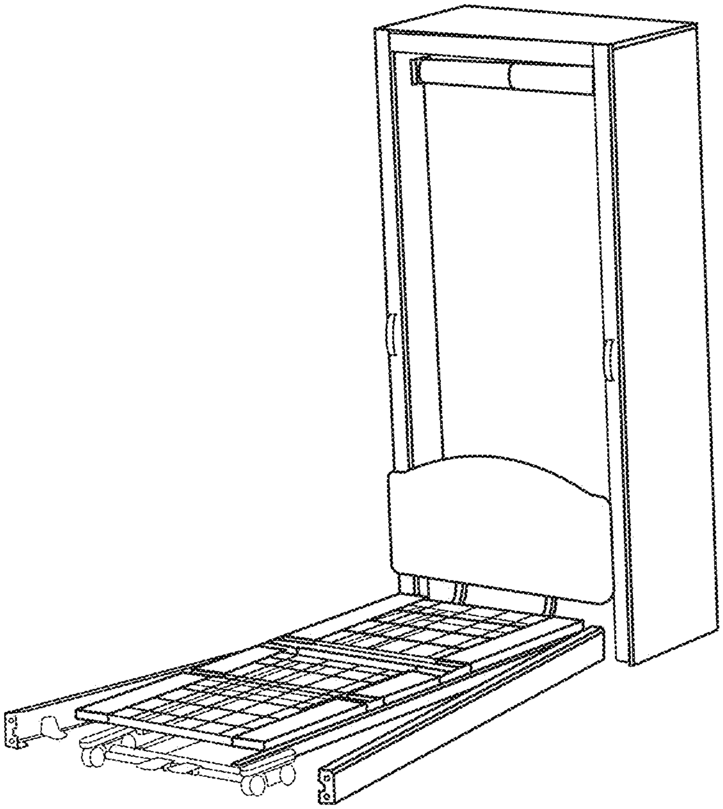
Figure 17D:
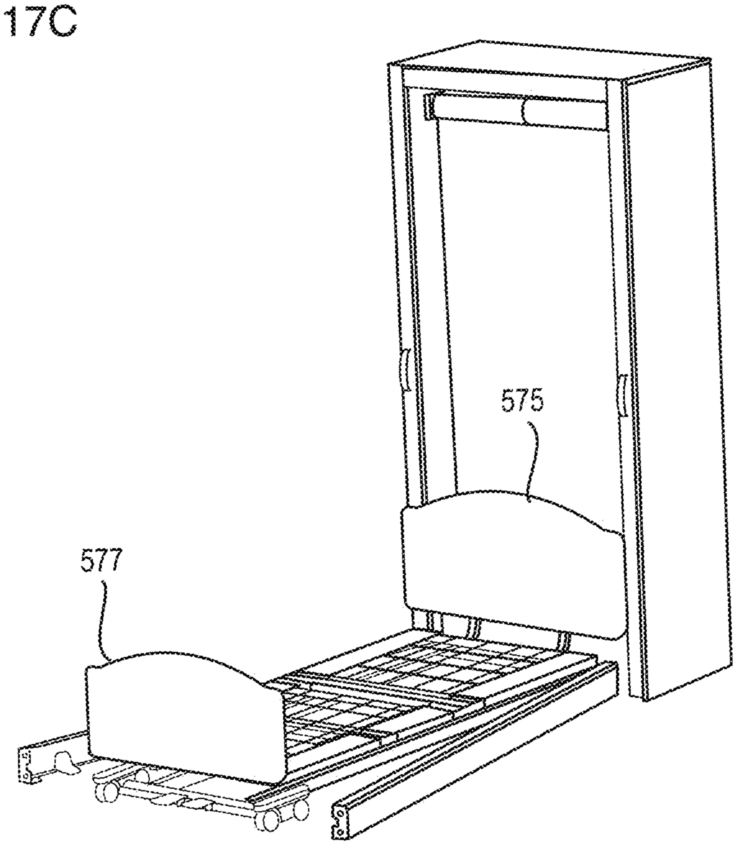
Figure 18A:
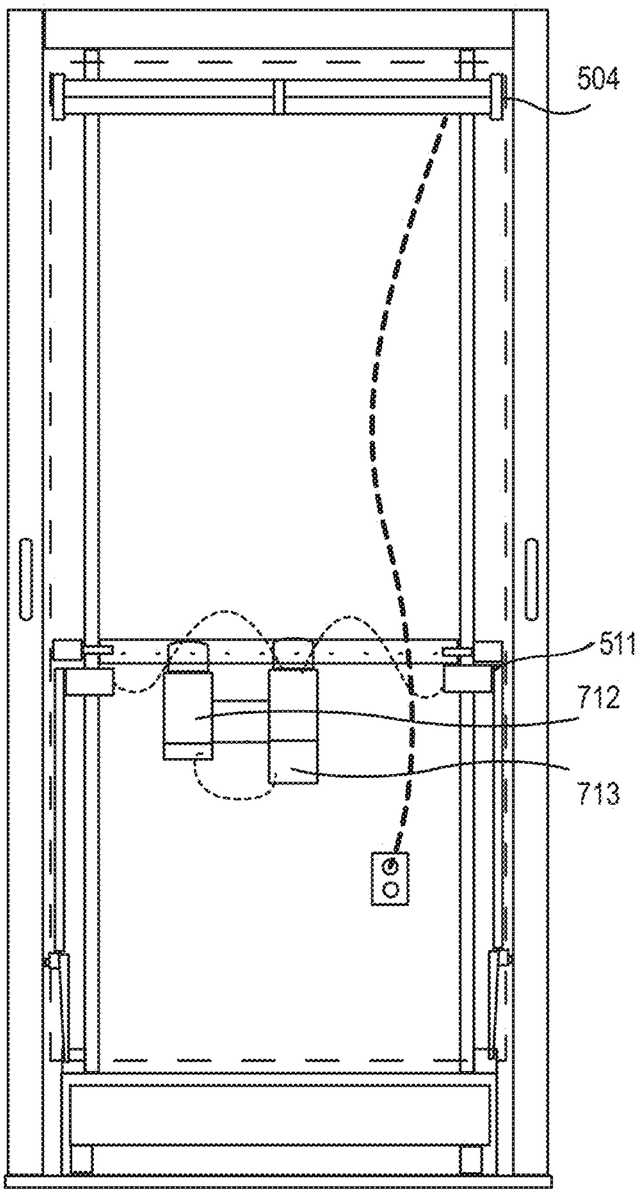
FIGS. 18A and 18B are front and side plan views illustrating the electrical and mechanical components of the bed lift system of FIG. 12A in accordance with some embodiments of the presently disclosed subject matter.
Figure 18B:
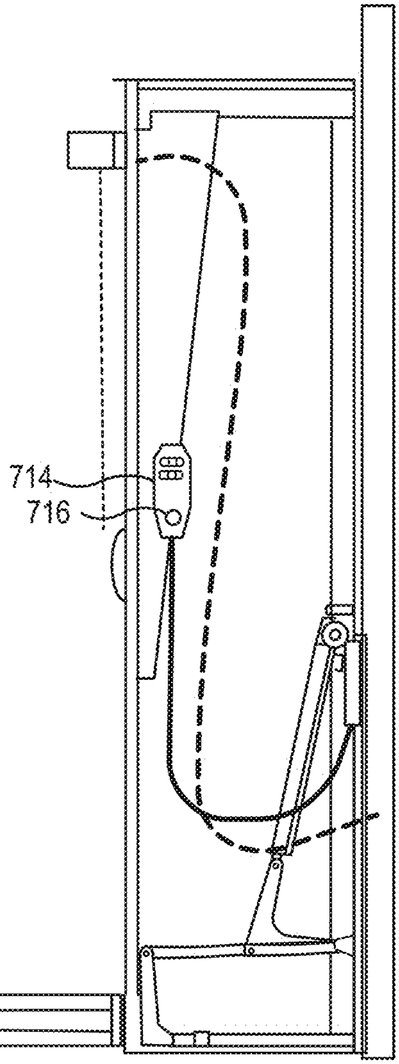
Figure 18B:
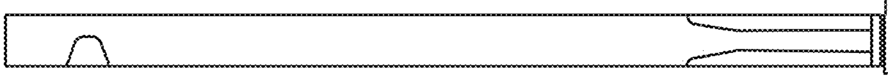
Figure 19A:
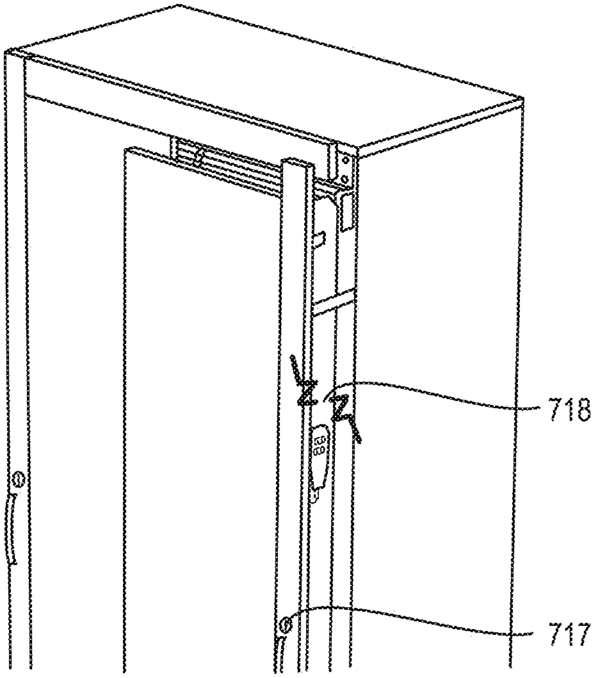
FIG. 19A is a side perspective view illustrating the electrical and mechanical components of the bed lift system of FIG. 12A in accordance with some embodiments of the presently disclosed subject matter.
Figure 19B:
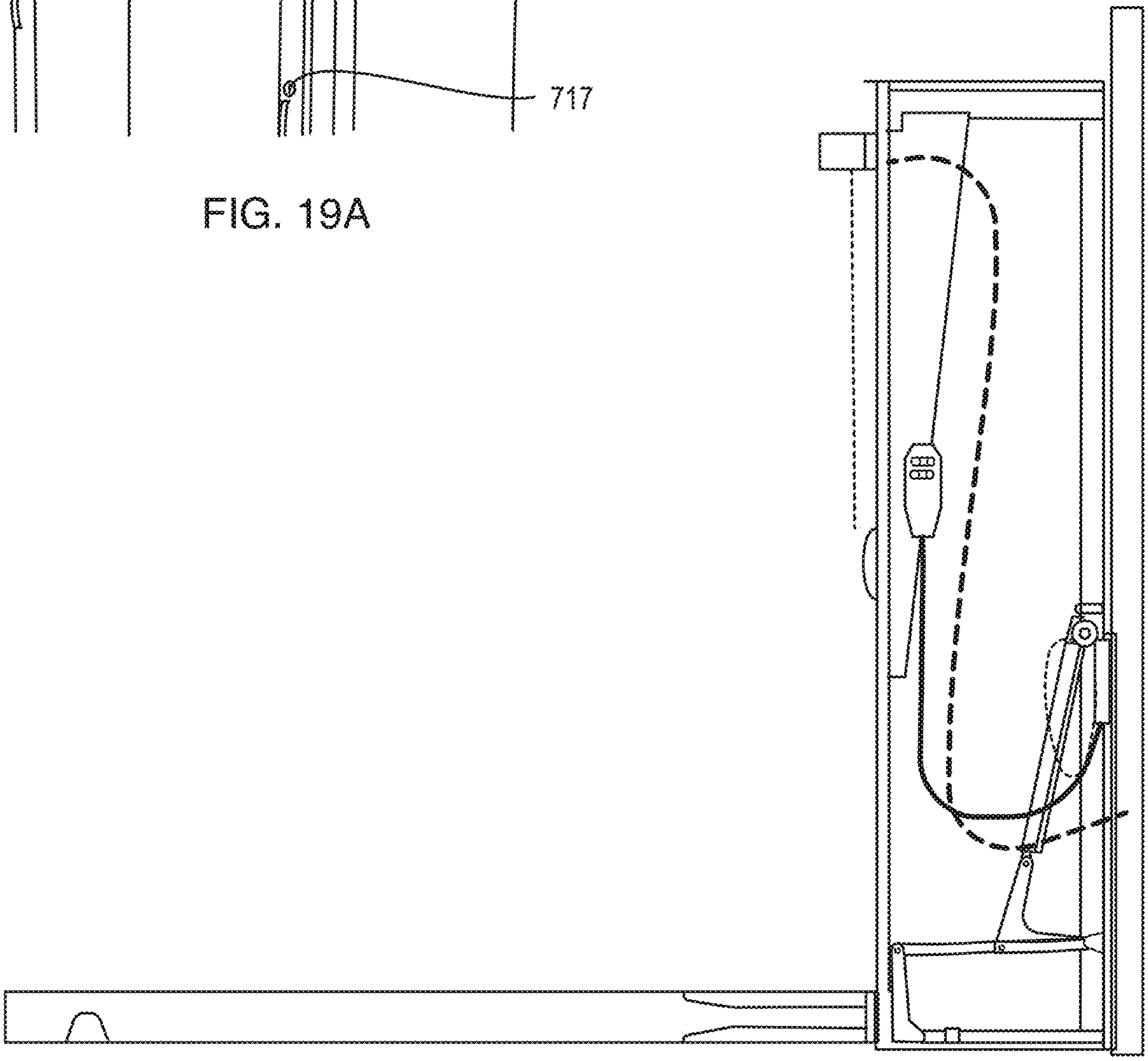
FIG. 19B is a side plan view illustrating the electrical and mechanical components of the bed lift system of FIG. 12A in accordance with some embodiments of the presently disclosed subject matter.

First ends of the swing arms (ends closest to storage unit 20A) are configured to pivotally swing outward about ends of the pivoting plate 538. As shown in FIG. 17B, in one embodiment, the first ends of the swing arms can be removably attached to the pivoting plate 538 by fasteners 573, and second ends of the swing arms are configured to removably attach to the end plate 536 to form a rectangular structure for securely receiving bed frame 515. End plate 536 is configured for detaching from the swing arms. After end plate 536 is detached, the swing arms can be pivotally swung outwards about the ends of the pivoting plate 538 (see FIG. 13) to release the bed frame.

In various embodiments, storage unit 20A is provided with bolting arrangements 554 near a bottom surface and near a back surface of the storage unit for securing the storage unit with the floor and the wall respectively, as shown in FIG. 12C.

In one embodiment, after the end plate 536 is attached to first swing arm 532 and second swing arm 534, the lift gate needs to be unlocked (by manual means or automatic means) before the support 510 can be lifted into the interior 530 of the storage unit.

Storage unit 20A also includes lift gate 550 configured within an interior 530 of the storage unit. Lift gate 550 includes linear actuator 552 for converting the support between a folded and an unfolded position by manipulating the pivoting plate coupled to linear actuator 552. In one embodiment, linear actuator 552 can be an electromechanical device. In one embodiment, linear actuator 552 can include a piston arrangement. In one embodiment, a motor is coupled to the linear actuator for operating the linear actuator, with the motor controlled by controller 713. The motor operates to aid in lifting and/or lowering support 510 and bed frame 515. The motor is not limited, and any known motor can be used. Storage unit 20A further includes one or more cabinet front doors 501 that can be maneuvered to the interior of the storage unit, as shown, for example, in FIGS. 14A to 14E. Accordingly, the front doors are configured to be pushed sideways into storage unit, and to be pulled outside of the storage unit and pivoted towards each other to close the opening of storage unit 20A, and locked with lock 718 (see FIG. 19A) to secure the contents within storage unit 20A. Accordingly, the storage unit is provided with a lock for securing the contents therein from unauthorized access. Also, each front door 501 can be provided with a handle 521 (see FIG. 12A). The lift system further includes a controller for controlling the lift gate that includes the linear actuator.

Figure 15A:
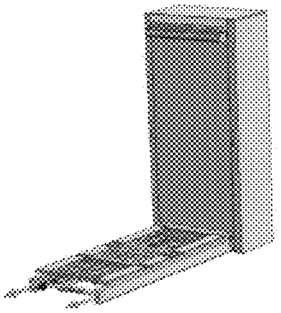
FIGS. 15A-15F are perspective views illustrating use of the bed lift system of FIG. 12A in accordance with some embodiments of the presently disclosed subject matter.
Figure 15B:
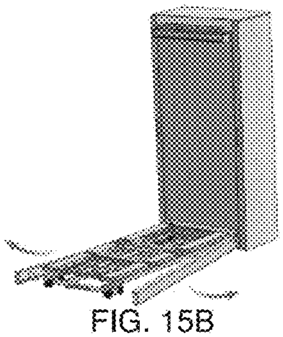
Figure 15C:
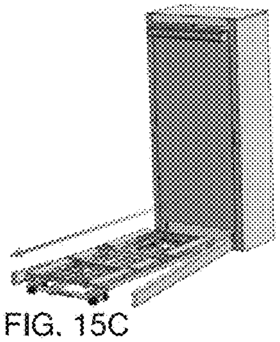

After the unfolding operation is completed, the bed frame can be released from the support (see FIG. 15C). A headboard and a footboard can then be attached to the bed frame (see FIGS. 15D, 17C and 17D). The bed frame can then be secured within the support by attaching end plate to the swing arms and activating a lock handle coupled to the end plate (see FIGS. 15E and 15F). A bed bearing surface 516 of the bed frame 515 can then be raised parallel to the floor to reach a predetermined height above floor, with lifting arms 517 (see FIG. 12D) of bed frame 515 supporting the elevated bed bearing surface 516. A bed (not shown) can then place on bed bearing surface 516.

Figure 14B:
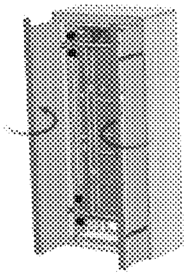
Figure 14C:
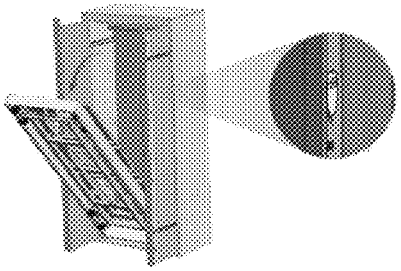
Figure 14D:
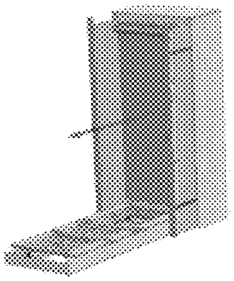
Figure 14E:
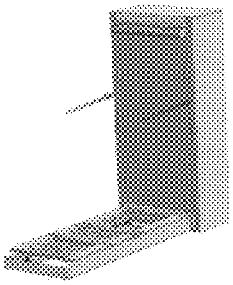

Referring to FIGS. 14A-14E, in step 1 shown in 14A, the front doors 501 can be pulled towards a user. Then, in step 2 as shown in FIG. 14B, the doors can be opened. Then, in step 3 shown in FIG. 14C, using controller access switch 714, the controller can be used to operate the lift gate to start to move support 510 from its folded position within the storage unit towards an unfolded position by manipulating the pivoting plate coupled to the linear actuator. The linear actuator 552 forms part of lift gate 550, and controller 713 operated by controller access switch 714 controls the operations of lift gate 550 and of linear actuator 552, in one embodiment. Then, in step 4 shown in FIG. 14D, false wall 505 can be slid towards a front outer periphery of the storage unit to form a front surface of the storage unit after the support is brought to the unfolded position. Accordingly, the storage unit includes a false wall 505 opposing front doors 501 such that the false wall is configured for sliding towards a front outer periphery of the storage unit to form a front surface of the storage unit after the support has been moved to an unfolded position. Then, in step 5 shown in FIG. 14E, front doors 501 can be pushed into the storage unit such that no portion of front doors 501 extends beyond the front outer periphery of the storage unit; thus, the doors can be pushed inwards sideways such that the doors are parallel to the side panels of the storage unit. In some embodiments, false wall 505 can include a grip to assist the user in pushing or pulling false wall 505 as desired.

Figure 15D:
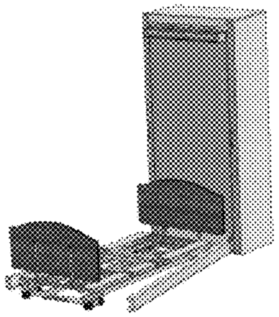
Figure 15E:
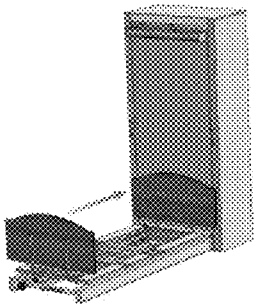
Figure 15F:
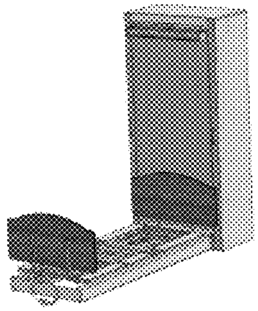

Then, in step 6 as shown in FIG. 15A, end plate 536 can be unlocked and removed to result in the configuration shown in FIG. 15A. Then, in step 7 as shown in FIG. 15B, the swing arms can be swung open to release bed frame 515. Then, in step 8 as shown in FIG. 15C, the wheels of the bed frame can be unlocked and the bed frame rolled away from the storage unit. Then in step 9 as shown in FIG. 15D, headboard 575 and footboard 577 can be attached to the bed frame. Then in step 10 as shown in FIG. 15E, the bed frame can be pushed back towards to the storage unit and the swing arms swung back inwards such that the bracket configuration in each of the swing arms cooperatively couples with the longitudinal side member(s) of bed frame 515. Then in step 11 as shown in FIG. 15F, end plate 536 can be re-attached to the swing arms to secure the bed frame back within support 510. In one embodiment, a twist and lock mechanism is provided for attaching or otherwise securing end plate 536 to first and second swing arms 532, 534.

By following the reverse process, lift system 5A can be used to enclose the support along with the bed frame within the interior of the storage unit in a folded position maneuver. In other words, by operating the lift gate, the support 510 along with bed frame 515 accommodated therein can be folded into the interior of storage unit 20A in the folded position.

Figure 16:
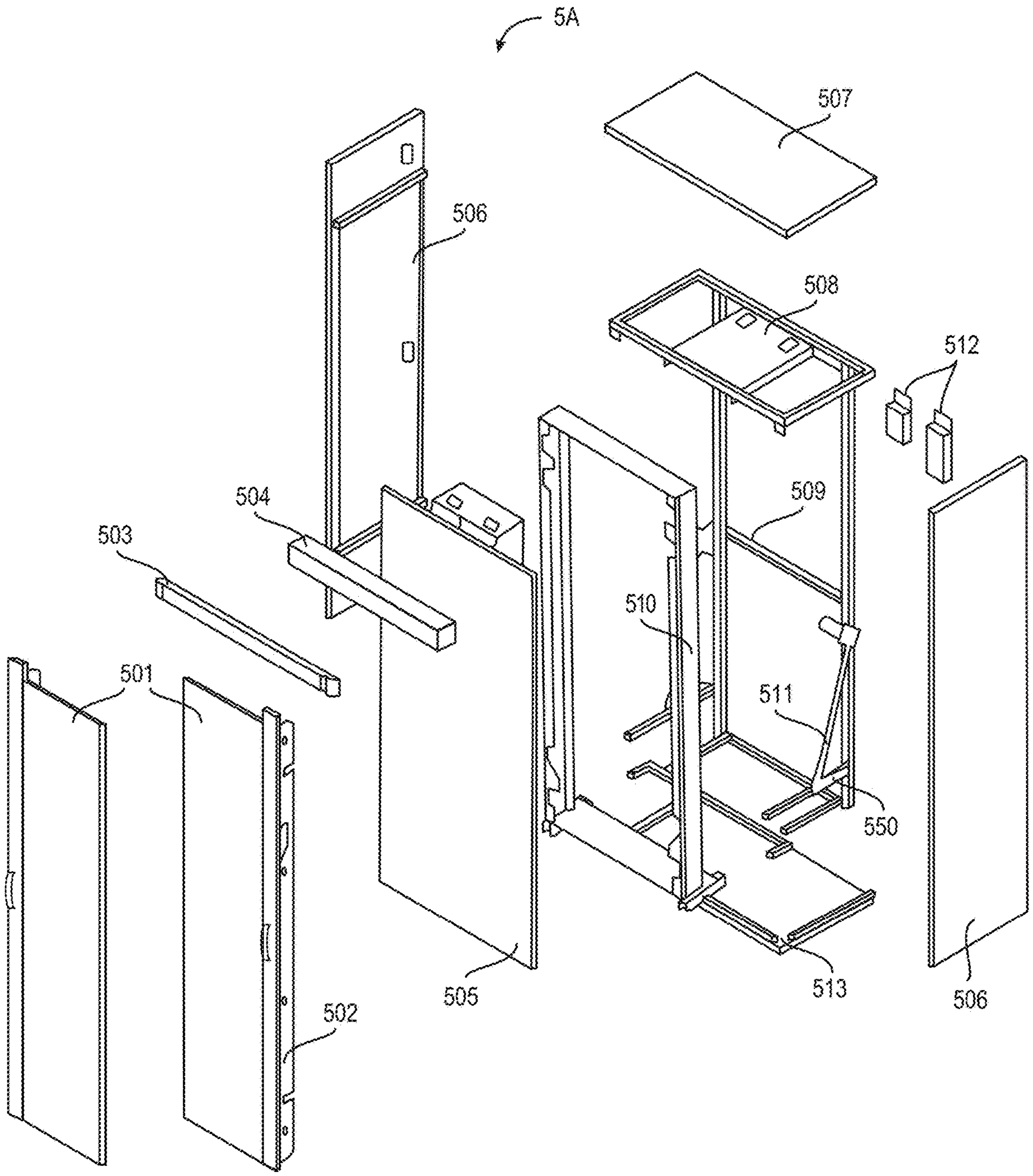
FIG. 16 is a blow-up perspective view illustrating various components of the bed lift system of FIG. 12A in accordance with some embodiments of the presently disclosed subject matter.

FIG. 16 illustrates various components of lift system 5A according to one or more embodiments of the presently disclosed subject matter. As shown in FIG. 16, the lift system can include cabinet front doors 501, drawer panels and brackets 502, header trim 503 (also see FIG. 17A), bed light 504, false wall 505, side panels 506, top panel 507, to frame 508, bottom frame 509, support 510, lift gate 550 including linear actuator 511, controller 512, and base board 513 in the manner illustrated at least in one embodiment of the presently disclosed subject matter.

FIGS. 18A, 18B, 19A and 19B illustrate additional components of lift system 5A according to one or more embodiments of the presently disclosed subject matter. As illustrated in these figures, lift system 5A can include linear actuator 511, power supply 712, controller 713, controller access switch 714, emergency call switch 716, lock 717 for securing cabinet doors, and power disconnect 718, in the manner illustrated in these figures in at least one embodiment of the presently disclosed subject matter.

Bed light 504 can be coupled to the false wall of the storage unit in one embodiment. In another embodiment, bed light 504 can be coupled to a front peripheral surface of the storage unit right about doors 501 and false wall 505. In one embodiment, bed light 504 may be turned on and off using a string, cable or chain mechanism whereby a patient or user can turn on and off bed light 504 by pulling on a toggle switch coupled to the string, cable or chain.

A method of folding a bed frame such as bed frame 515 into the interior 530 of a storage unit includes: positioning bed frame 515 within support 510; securing bed frame 515 within support 510 by attaching the end plate 536 to the swing arms; operating controller 713 via controller access switch 714, for example, to move support 510 including bed frame 515 from an unfolded position outside the storage unit (see FIG. 14E, for example) to a folded position within the storage unit (see FIG. 14B for example) using lift gate 550 by manipulating pivoting plate 538 coupled to linear actuator 511 of lift gate 550, lift gate 550 being configured within an interior of the storage unit; maneuvering front doors of the storage unit from the interior of the storage unit to a front outer periphery of the storage unit to close the storage unit (the reverse of what is shown in FIGS. 14A and 14B), and locking the front doors 501. Controller 713 can be operated to bring the support 510 from the unfolded position to a folded position, and vice versa in an automated set-up by operating controller access switch 714.

A method of moving the support from a folded position to an unfolded position includes operating a controller such as controller 713 to move the support 510 including the bed frame 515 from the folded position within the storage unit to the unfolded position outside the storage unit using the lift gate. The method further comprises releasing the bed frame from the support. The method also includes attaching a headboard and a footboard to the bed frame. The method additionally includes securing the bed frame back within the support by attaching end plate to the swing arms and activating a lock handle coupled to the end plate. The method furthermore includes raising a bed-bearing surface of the bed frame parallel to floor to reach a predetermined height above floor; and placing a bed or mattress on the bed-bearing surface. The method can also include maneuvering the front doors of the storage unit into the interior of the storage unit.

Figure 21A:
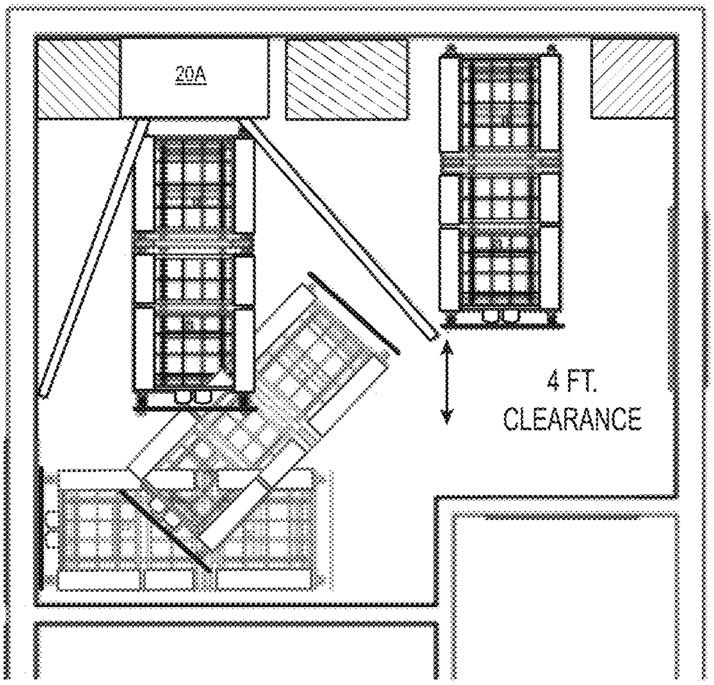
FIGS. 21A-21D are top plan views illustrating various configurations of using the bed lift systems of FIG. 12A in accordance with some embodiments of the presently disclosed subject matter.
Figure 21B:
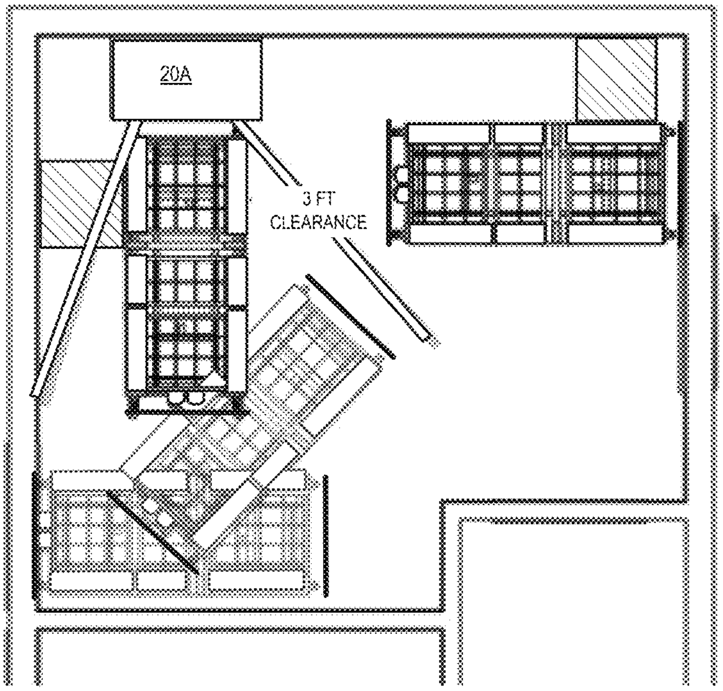
Figure 21C:
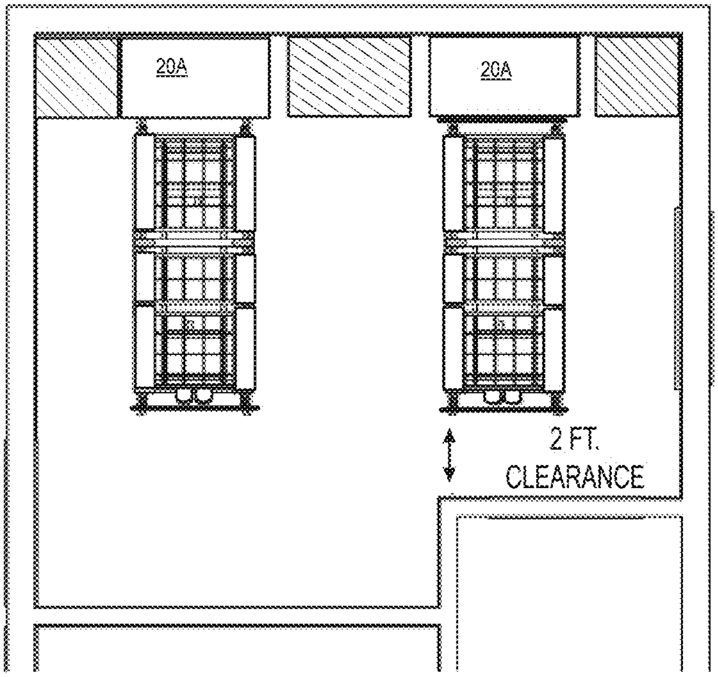
Figure 21D:
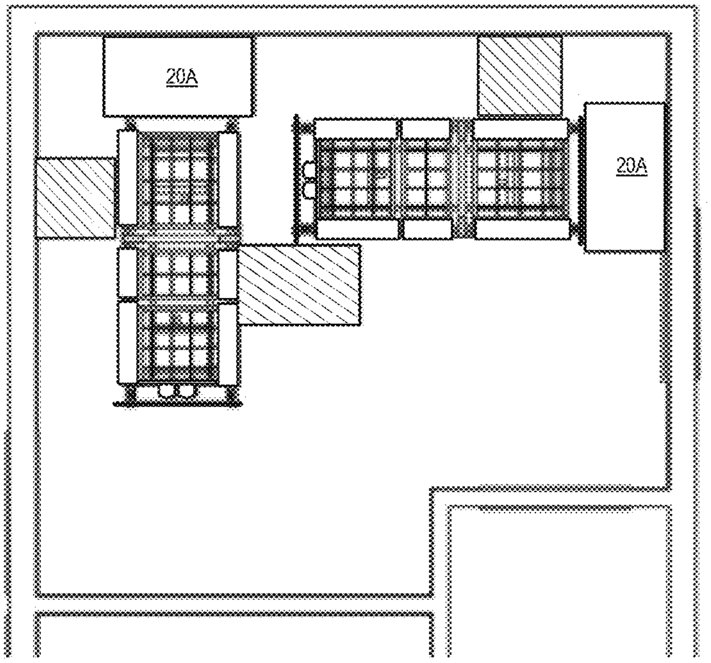

FIGS. 21A-21D illustrate various configurations of arranging bed frames enclosed within storage unit 20A according to one more embodiments of the presently disclosed subject matter. As shown in FIGS. 21A and 21B, after the support 510 is brought to the unfolded position out of storage unit 20A, the bed frame 515 can be disengaged from support 510 and maneuvered in the manner illustrated therein to bring the bed frame 515 to its respective final position as preferred by the user. According to some embodiments of the presently disclosed subject matter, the configurations illustrated can allow more than one bed frame to be accommodated within a single room or cabin. For example, FIGS. 21C and 21D illustrate configurations that include two storage units 20A located within the same room or cabin whereby two bed frames can be accommodated within the same room or cabin.

Figure 22:
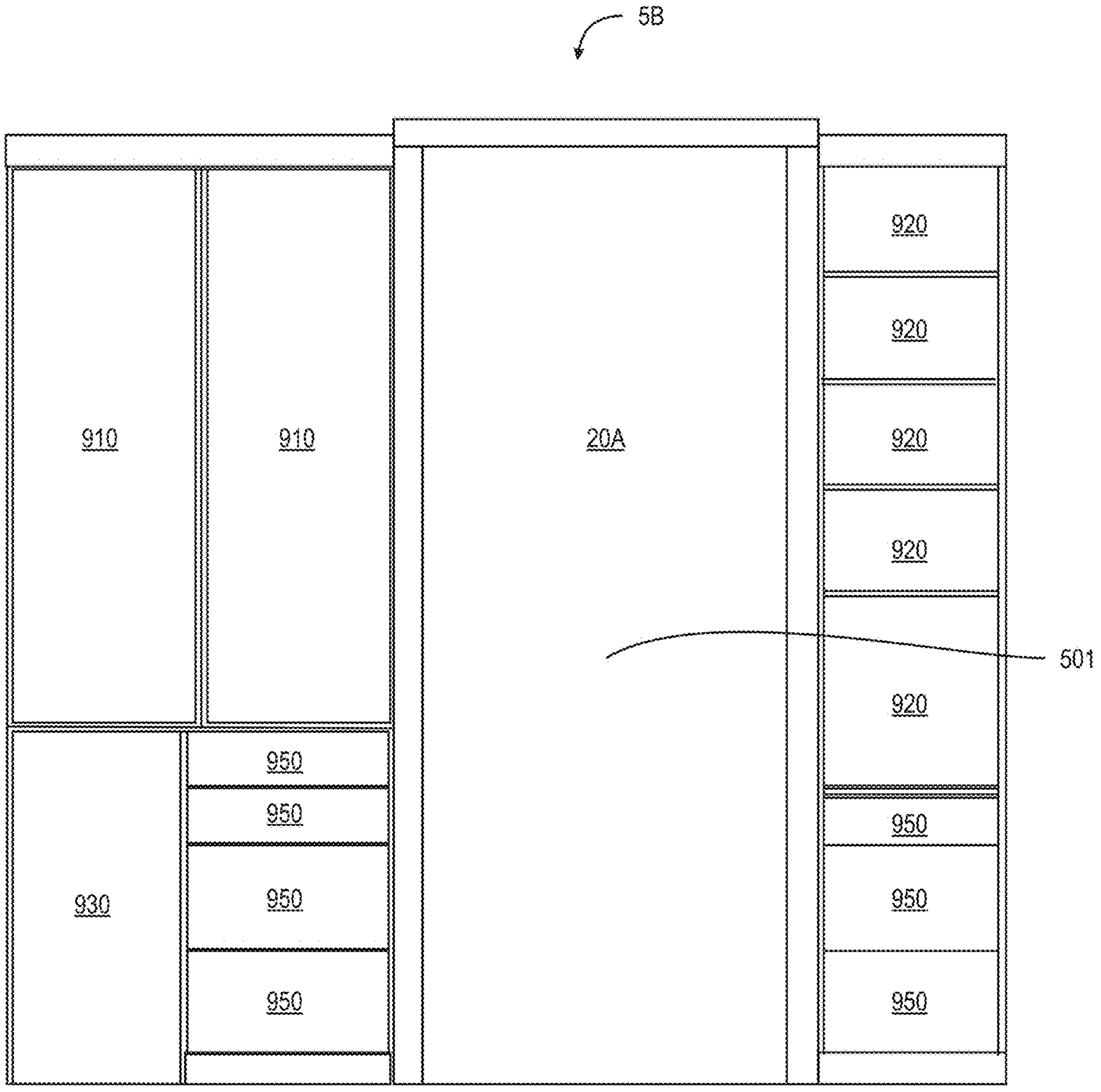
FIG. 22 is a front plan view of a bed lift system in accordance with some embodiments of the presently disclosed subject matter.

FIG. 22 illustrates lift system 5B according to one or more embodiments of the presently disclosed subject matter. Lift system 5B is similar to lift system 5A described, except as described herein. Lift system 5B can be conveniently configured as an "in-wall" closet arrangement that can span the entire wall on one side of a room or cabin. For example, as shown in FIG. 22, lift system 5B can include one or more storage credenzas 910, one or more bookshelves 920, one or more wheel chair storage compartment 930, and one or more drawers 950 flanking either sides of storage unit 20A. In one embodiment, wheel chair storage compartment 930 can include a door. In one embodiment, additional storage units 20A can be positioned to the left and/or the right of the configuration illustrated in FIG. 22. Lift system 5B can accordingly be built into the wall of a room or cabin from the floor to the ceiling and can include one or more storage units 20A built therein. Further, lift system 5B can include various features including credenzas, bookshelves, wheel chair storage space(s), and drawers, among others, with front doors 501 of storage unit 20A flush with those other features to provide an aesthetic look.

The lift systems 5, 5A and 5B as disclosed herein can include several additional features not explicitly illustrated in the Figures. For example, in one embodiment, the system can include a television (TV) stand or holder coupled to a panel located at, near, or above a top end of the storage unit. In one embodiment, a TV stand or holder can be coupled to the false wall of the storage unit. In another embodiment, the TV stand or holder can be coupled to a front peripheral surface of the storage unit right above doors 501 and above false wall 505. In one embodiment, the TV stand or holder can be mounted on an articulating arm that will articulate from the side of the storage unit and drop down in front of the patient in the bed placed on the bed frame. In one further embodiment, refrigerator space or refrigerator cove can also be provided for accommodating a refrigerator; in one embodiment, the lift system as described herein can include a refrigerator whose front face and/or door is designed to blend with the remaining cabinets and similar other features that form part of the lift system.

In one embodiment, the lift systems as disclosed herein can include a bedside table that folds out from a side panel located next to front doors 501 of the storage unit. In one embodiment, one or more wardrobes may be included as part of the lift systems as disclosed herein. In one embodiment, one or more dressers and book shelving options are provided available for addition to the lift systems as disclosed herein. In various embodiments, a nurse call switch can be coupled to the storage unit for summoning medical help. In some embodiments, an oxygen equipment storage chamber can be provided as part of the lift system. In some embodiments, one or more speakers can be embedded in the cabinets positioned on either side of storage unit 20A. In some embodiments, the embedded or built-in speakers can include Bluetooth capability.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

These and other changes can be made to the disclosure in light of the Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

What is claimed is:

1. A lift system for a bed in a medical setting, the lift system comprising:

a support configured to maintain a bed frame thereon, the support defined by:

a first swing arm opposing a second swing arm;

a pivoting plate opposing an end plate;

a bed frame received within the support, wherein first ends of the swing arms are configured to swing outward about ends of the pivoting plate, wherein second ends of the swing arms are configured to removably attach to the end plate to form a rectangular structure for securely receiving a bed frame, wherein the end plate detaches from the swing arms and the swing arms pivotally swing outwards about the ends of the pivoting plate to release the bed frame; and a storage unit defined by a lift gate configured within an interior of the storage unit, the lift gate including a linear actuator for converting the support between a folded and an unfolded position by manipulating the pivoting plate coupled to the linear actuator, wherein the bed frame is enclosed within an interior of the storage unit.

2. The lift system of claim 1, further comprising one or more front doors that can be maneuvered to the interior of the storage unit.

3. The lift system of claim 1, further comprising a controller for controlling the lift gate, wherein the lift gate is unlocked to allow the support to be lifted into the interior of the storage unit after the end plate is attached to the swing arms.

4. The system of claim 2, wherein the storage unit includes a false wall opposing the front doors, wherein the false wall is configured for sliding towards a front outer periphery of the storage unit to form a front surface of the storage unit after the support moves to the unfolded position.

5. The system of claim 4, wherein the front doors are configured to be maneuvered sideways into storage unit.

6. The system of claim 4, further comprising a bed light coupled to a front top portion of the storage unit.

7. The system of claim 1, further comprising an emergency call switch coupled to the storage unit for summoning medical help.

8. The system of claim 1, further comprising a motor for operating the linear actuator.

9. The system of claim 1, further comprising bolting arrangements near a bottom surface and near a back surface of the storage unit for securing the storage unit.

10. The system of claim 1, further comprising a controller access switch for operating the controller.

11. The system of claim 1, wherein the storage unit further comprises a lock for securing contents therein from unauthorized access.

12. The system of claim 1, wherein the swing arms are removably attached to the pivoting plate by fasteners.

13. The system of claim 1, wherein each swing arm includes a bracket configuration for cooperatively receiving longitudinal side members of the bed frame.

14. The system of claim 1, wherein the system is further configured to: release the bed frame from the support; attach a headboard and a footboard to the bed frame; secure the bed frame back within the support by attaching the end plate to the swing arms and activating a lock handle coupled to the end plate; raise a bed-bearing surface of the bed frame parallel to a floor to reach a predetermined height above the floor; and place a mattress or bedding on the bed-bearing surface.

* * * * *